United States Patent
Maruo et al.

[11] Patent Number: 5,432,525
[45] Date of Patent: Jul. 11, 1995

[54] MULTIMEDIA TELEMEETING TERMINAL DEVICE, TERMINAL DEVICE SYSTEM AND MANIPULATION METHOD THEREOF

[75] Inventors: Seizi Maruo, Hitachi; Kozo Nakamura, Hitachiota; Norifumi Yanai, Ibaraki; Masahiro Takahashi, Hitachi, all of Japan

[73] Assignee: Hitachi, Ltd., Tokyo, Japan

[21] Appl. No.: 556,460

[22] Filed: Jul. 24, 1990

[30] Foreign Application Priority Data

Jul. 26, 1989 [JP] Japan ................. 1-191469

[51] Int. Cl.6 .............................. G09G 5/12
[52] U.S. Cl. ................................ 345/2
[58] Field of Search ........... 340/721, 734, 717; 358/83, 85, 181, 183; 379/53, 54; 345/2

[56] References Cited

U.S. PATENT DOCUMENTS

| | | | |
|---|---|---|---|
| 4,054,908 | 10/1977 | Poirier | 358/85 |
| 4,692,757 | 9/1987 | Tsuhara et al. | 340/721 |
| 4,789,962 | 12/1988 | Berry et al. | 340/721 |
| 4,808,992 | 2/1989 | Beyers, Jr. | 340/825.24 |
| 4,890,098 | 12/1989 | Dawes et al. | 340/721 |
| 4,953,159 | 8/1990 | Hayden et al. | 379/53 |
| 4,987,492 | 1/1991 | Stults et al. | 379/53 |

FOREIGN PATENT DOCUMENTS

| | | | |
|---|---|---|---|
| 1195763 | 10/1985 | Canada | 350/3 |
| 1206748 | 7/1986 | Canada | 35/65 |
| 0041902 | 12/1981 | European Pat. Off. | |
| 3823219 | 5/1989 | Germany | |
| 114641 | 6/1961 | Japan | |
| 0157491 | 12/1987 | Japan | |
| 197212 | 8/1988 | Japan | |

OTHER PUBLICATIONS

Funkschau, vol. 61, No. 7, Mar. 23, 1989, pp. 44–46, Munchen, DE; P. Pernsteiner et al: "Videokonferenz mit dem PC".

2nd IEEE Conference on Computer Workstations, Mar. 7th–10th, 1988 Santa Clara, pp. 122–131, IEEE; G. L. Fisher et al: "Tools for Building Image Processing and Graphics Applications in a Workstation Environment".

IEEE Global Telecommunications Conference and Exhibition, Hollywood, Fla., Nov. 28, 1988, "Communications for the Information Age", Conference Record, vol. 1, pp. 32–36, IEEE; T. Komiya et al, An Approach to the Multifunction Graphic Terminal for the ISDN Environment.

*Primary Examiner*—Jeffery Brier
*Attorney, Agent, or Firm*—Antonelli, Terry, Stout & Kraus

[57] ABSTRACT

In a telemeeting terminal for performing communication between remote locations by using multiple media, the other party of a meeting is identified in a display picture and thereafter switching to a principal picture for presenting and explaining materials meeting is performed. As a result, it is possible to keep materials used in the meeting secret.

62 Claims, 16 Drawing Sheets

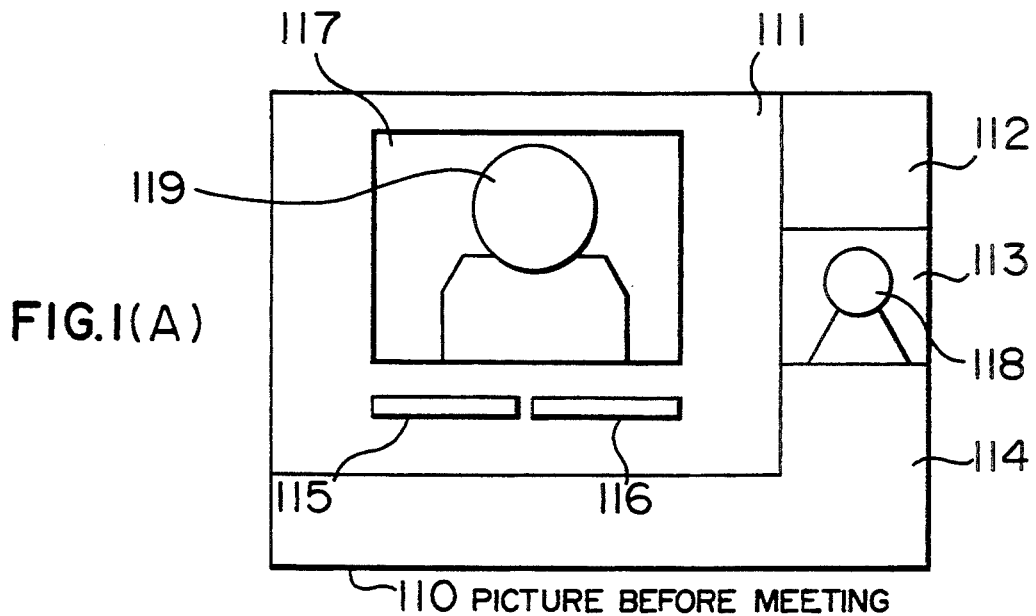
FIG.1(A) 110 PICTURE BEFORE MEETING
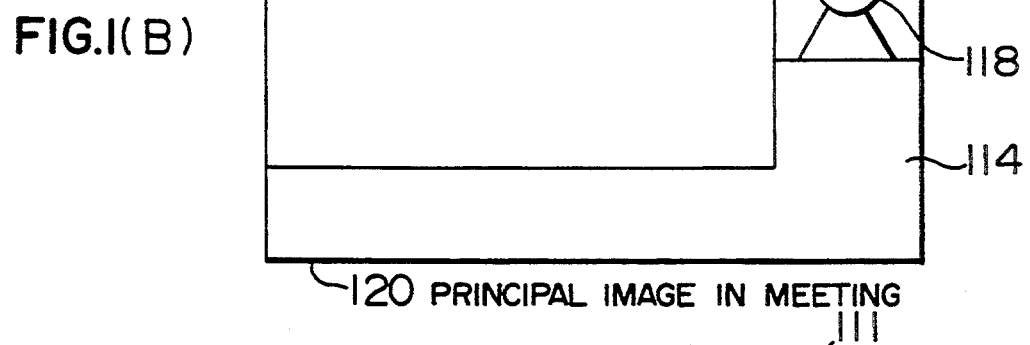
FIG.1(B) 120 PRINCIPAL IMAGE IN MEETING
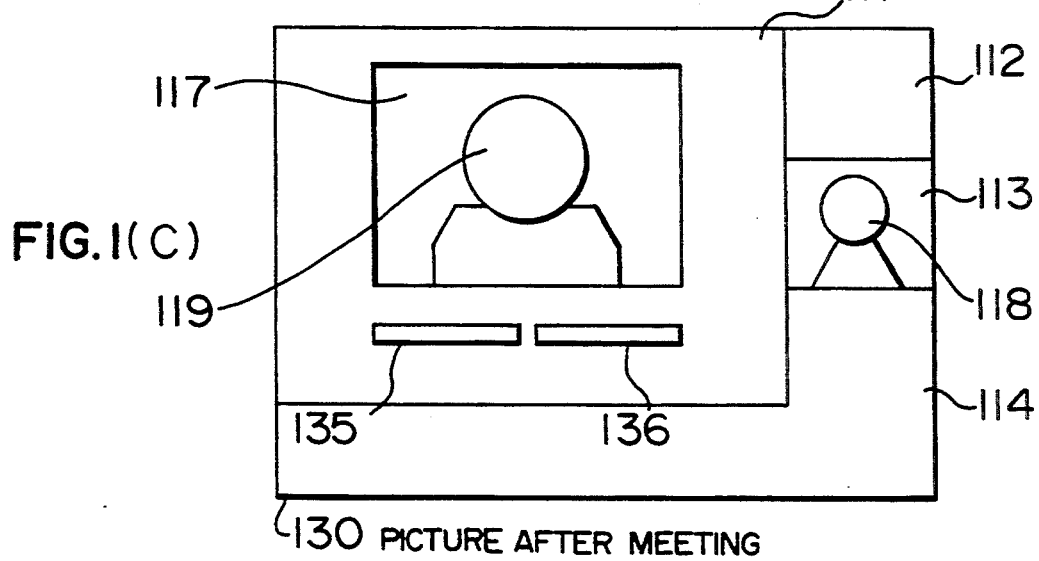
FIG.1(C) 130 PICTURE AFTER MEETING

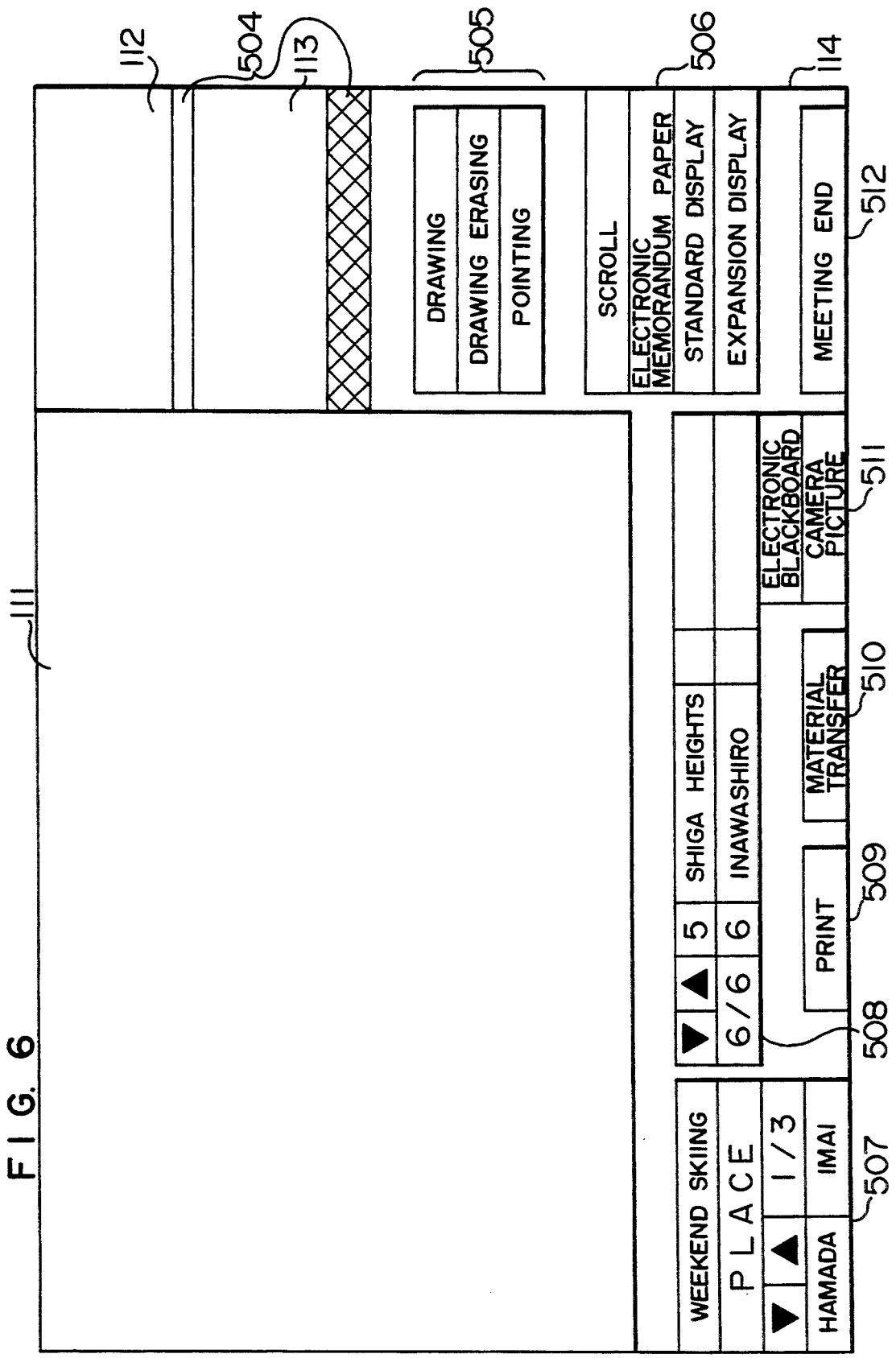

FIG. 7

| SELECTION MENU NO. | 1 | 2 | 3 | 4 | 5 |
|---|---|---|---|---|---|
| DISPLAY CONTENTS | MEETING START | MEETING SUSPENSION | MEETING END | COMMUNI- CATION END | MEETING RESTART |

FIG. 8

| SELECTION MENU NO. / MENU AREA | 1 | 2 | 3 | 4 | 5 |
|---|---|---|---|---|---|
| X-COORDINATE UPPER LEFT | X10 | X20 | X30 | X40 | X50 |
| Y-COORDINATE UPPER LEFT | Y10 | Y20 | Y30 | Y40 | Y50 |
| X-COORDINATE BOTTOM RIGHT | X11 | X21 | X31 | Y41 | Y51 |
| Y-COORDINATE BOTTOM RIGHT | Y11 | Y21 | Y31 | Y41 | Y51 |

FIG. 9

| SELECTION MENU NO. / PICTURE NO. | 1 | 2 | 3 | 4 | 5 |
|---|---|---|---|---|---|
| PICTURE 1 | 1 | 1 | 0 | 0 | 0 |
| PICTURE 2 | 0 | 0 | 1 | 0 | 0 |
| PICTURE 3 | 0 | 0 | 0 | 1 | 1 |

FIG. 10

| SELECTION MENU NO. / PICTURE NO. | 1 | 2 | 3 | 4 | 5 |
|---|---|---|---|---|---|
| PICTURE 1 | | PICTURE 2 | LINE DIS- CONNECTION | | |
| PICTURE 2 | | | PICTURE 3 | | |
| PICTURE 3 | | | | LINE DIS- CONNECTION | PICTURE 2 |

| MSB | | | | | | | LSB |
|---|---|---|---|---|---|---|---|
| 7 | 6 | 5 | 4 | 3 | 2 | 1 | 0 |
| 1 | PX | 0 | 0 | 0 | SW3 | SW2 | SW1 |
| 0 | X6 | X5 | X4 | X3 | X2 | X1 | X0 |
| 0 | X13 | X12 | X11 | X10 | X9 | X8 | X7 |
| 0 | Y6 | Y5 | Y4 | Y3 | Y2 | Y1 | Y0 |
| 0 | Y13 | Y12 | Y11 | Y10 | Y9 | Y8 | Y7 |

X0~X13 : X-COORDINATES IN BINARY NUMBER
Y0~Y13 : Y-COORDINATES IN BINARY NUMBER
SW1 : STATE OF MAIN SWITCH OF STYLUS PEN
   1 = ON , 0 = OFF
SW2 : STATE OF SUB SWITCH 1 OF STYLUS PEN
   1 = ON , 0 = OFF
SW3 : STATE OF SUB SWITCH 2 OF STYLUS PEN
   1 = ON , 0 = OFF
PX : EFFECTIVE DISTANCE
   1 = OUTSIDE OF EFFECTIVE DISTANCE
   0 = WITHIN EFFECTIVE DISTANCE

F I G. 13

| CONDITION / MODE | STATE 1<br>PX = 1<br>SW₁ = 0 | STATE 2<br>PX = 1<br>SW₁ = 1 | STATE 3<br>PX = 0<br>SW₁ = 0 | STATE 4<br>PX = 0<br>SW₁ = 1<br>WITHIN MENU AREA | STATE 5<br>PX = 0<br>SW₁ = 0<br>WITHIN MENU AREA |
|---|---|---|---|---|---|
| MODE 0 | MODE 1 | MODE 0 | MODE 0 | MODE 0 | MODE 0 |
| MODE 1 | MODE 1 | MODE 1 | MODE 1 | MENU SELECTION MODE 0 | MODE 1 |

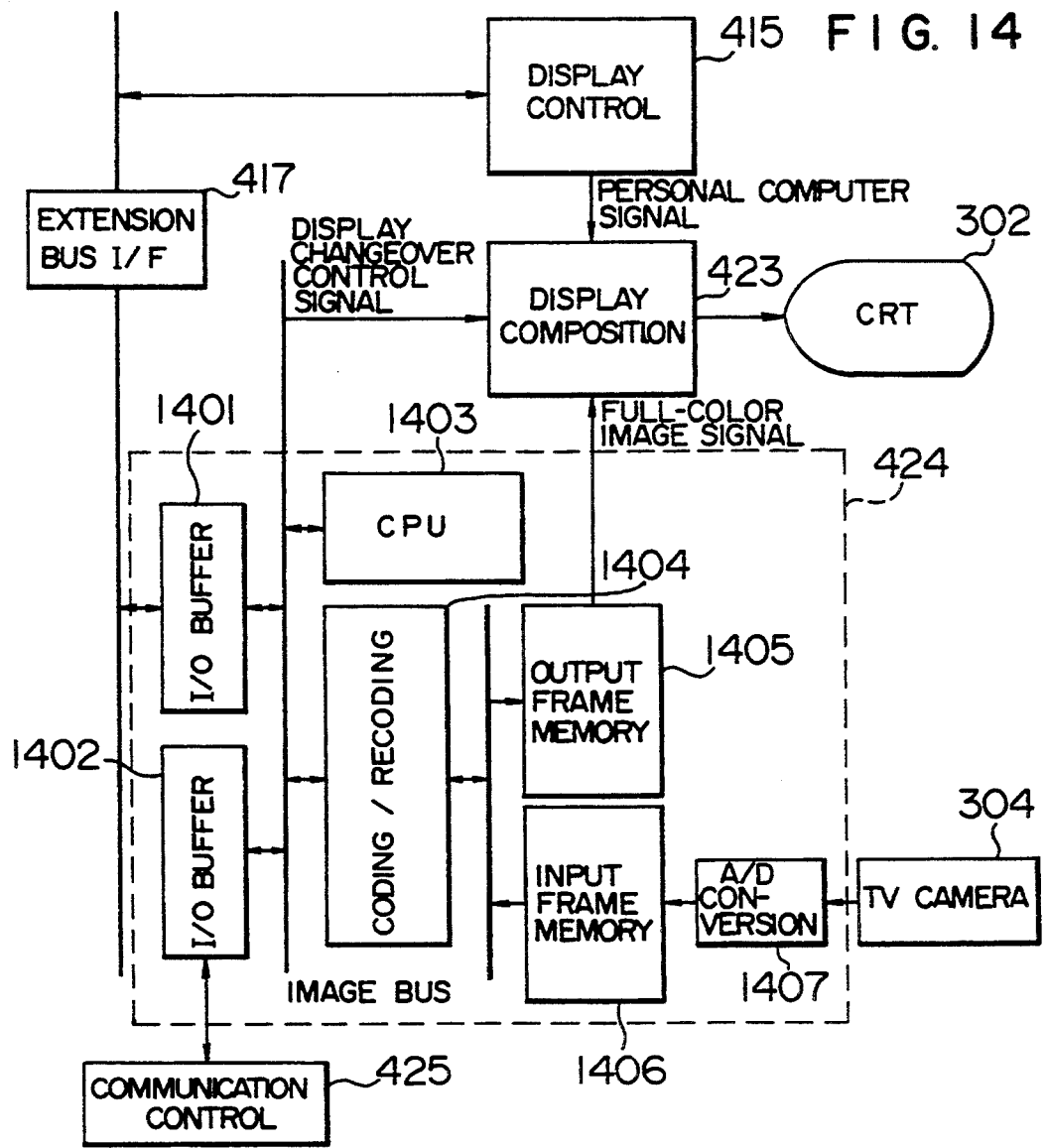

F I G. 17
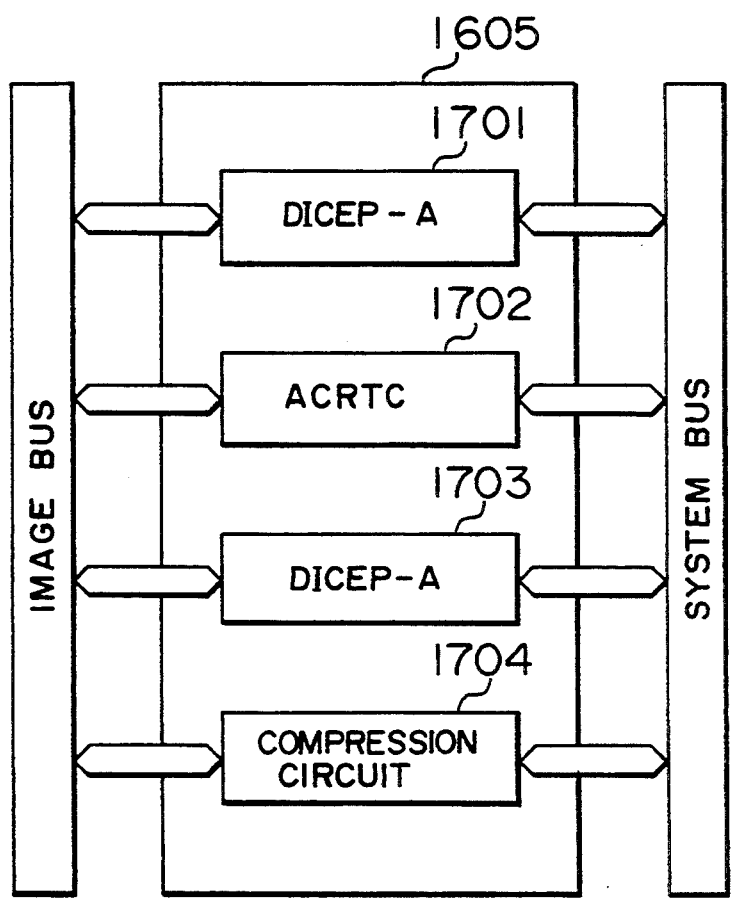

FIG. 18
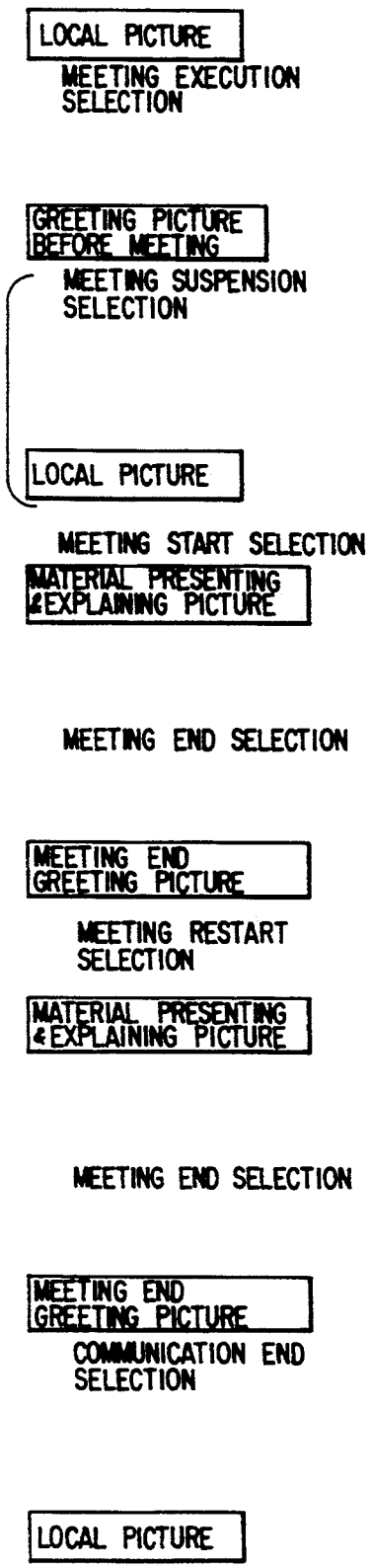
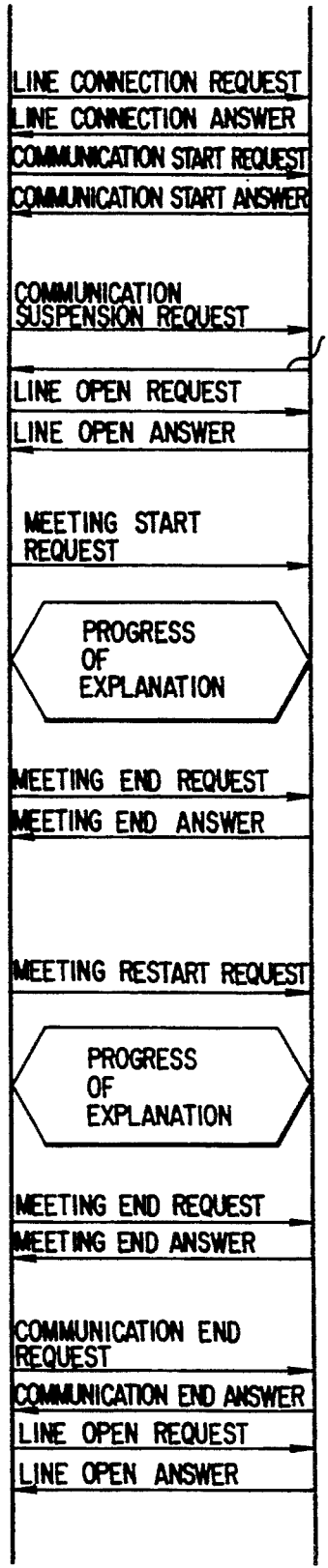
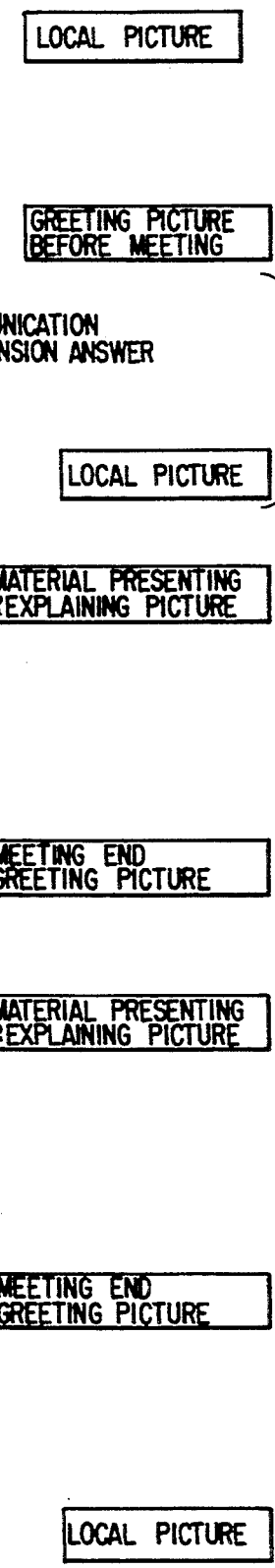

F I G. 24
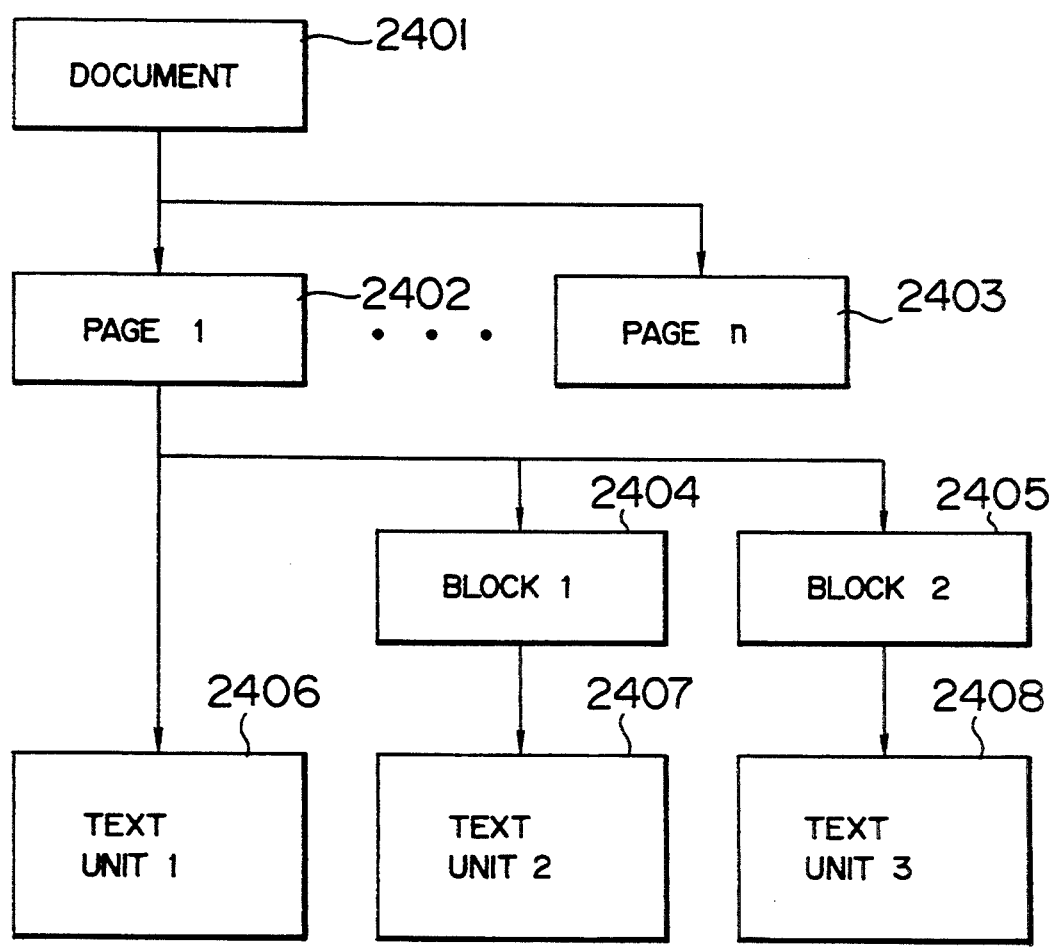

MULTIMEDIA TELEMEETING TERMINAL DEVICE, TERMINAL DEVICE SYSTEM AND MANIPULATION METHOD THEREOF

BACKGROUND OF THE INVENTION

The present invention relates to telemeeting terminal devices for performing communication between remote locations by using multiple media (i.e., multimedia telemeeting terminal devices), and in particular to a screen display method for keeping materials of previous arrangements secret.

Conventional terminal devices are described in JP-A-61-114641. In terminals allowing communication of audio data and image or code data, audio system service messages, data system messages or communication data are automatically displayed in varied picture configurations in accordance with the use situation of the user.

In case one terminal device (hereafter simply referred to as terminal) is used in common by a plurality of users, switching to pictures (explanation pictures) used for presenting materials mutually to give explanations during a meeting is immediately performed. The above described conventional technology thus has a problem in keeping a secret.

SUMMARY OF THE INVENTION (1) An object of the present invention is to realize secret operation by providing a step for necessarily identifying the other party of the meeting which is the subject of the terminal before picture switching is performed during a meeting.

(2) Another object of the present invention is to provide a user with a picture for identifying the other party of the meeting so that the user may easily identify the other party of the meeting.

(3) Still another object of the present invention is to provide convenient terminal use suitable for the situation of the meeting by automatically providing multi-window display of multiple media centering around a required principal medium according to the progress of the meeting.

(4) Yet another object of the present invention is to make troublesome manipulation of the terminal by the user such as window setting and window arrangement unnecessary and hence provide convenient terminal use by adopting fixed windows for multiwindow display of the provided multiple media.

(5) Still yet another object of the present invention is to provide a convenient environment by automatically displaying a picture before meeting so that the other party of the meeting may be identified when the communication line has been connected.

(6) A further object of the present invention is to provide a communication meeting using telemeeting terminals with a closer resemblance to an interview meeting and hence provide a convenient terminal use by providing a picture before the meeting centering around the dynamic picture display of the person of the other party in addition to the principal picture of the meeting having media other than dynamic pictures.

(7) A still further object of the present invention is to provide simple means for informing the terminal of identification of the other party by providing menu selection means as means for informing the terminal that the other party has been identified.

(8) A yet further object of the present invention is to provide a convenient environment by displaying the principal pictures of the meeting under the condition that the screen is divided into an image display area common to the terminal of the other party and a menu display area of meeting support for controlling the common image.

(9) A still yet further object of the present invention is to facilitate selection of the menu for identifying the other party and hence provide a convenient environment by displaying a menu (hereafter used to mean a selected menu item or a picture or a display frame displaying a menu item) for informing the terminal that the other party has been identified on the common image display area independently of the meeting support menu displayed on the menu display area.

(10) An additional object of the present invention is to provide a convenient environment by mutually displaying an image, which is inputted at the terminal of the other party, at its own terminal in pictures before meeting for identifying both sides before the start of the meeting and displaying either of images inputted at its own terminal and images inputted at the terminal of the other party on both terminals in principal pictures of the meeting.

(1) In order to achieve the above described object, there are provided means for identifying the other party of the meeting, means for informing the terminal device of the other party that the other party of the meeting has been identified, means for storing principal pictures of the meeting, and means for displaying the principal pictures thus stored.

(2) In order to achieve the above described another object, there is provided means for storing a picture before meeting.

(3) In accordance with the above described still another object, there are provided means for displaying multiple media with multiple windows and means for storing initial display positions and sizes of respective media.

(4) In order to achieve the above described yet another object, there is provided means for storing fixed multiwindow display of multiple media according to the progress of the meeting.

(5) In order to achieve the above described still yet another object, there is provided means for automatically displaying the picture before meeting when communication lines have been connected.

(6) In order to achieve the above described further object, there are provided means for audio communication, means for displaying at least a dynamic picture in the picture before meeting and means for displaying media other than the dynamic picture in the principal picture of the meeting.

(7) In order to achieve the above described still further object, there are provided means for storing menu pictures, means for displaying menu pictures, means for making menu selection possible and means for informing the other party of the selected menu.

(8) In order to achieve the yet further object, there are provided means for storing a menu display area controlling common images and means for storing contents of the displayed menu.

(9) In order to achieve the above described still yet further object, there are provided means storing menus for informing the terminal that the other party has been identified and means for combining the above described menus and displaying the result on the common image display area.

(10) In order to achieve the above described additional object, there are provided means for transmitting images inputted at its own terminal to the terminal of the other party at the stage of identification of both sides before meeting, means for displaying images transmitted from the terminal of the other party at that stage, means for selecting either images inputted at its own terminal or images inputted at the terminal of the other party in the principal picture of the meeting, and means for displaying images inputted at its own terminal in case input images should be displayed on its own terminal.

(1) The other party of a meeting is identified by the means for identifying the other party of the meeting. The terminal of the other party is informed that the other party of the meeting has been identified by the means for informing the terminal of the other party that the other party of the meeting has been identified. Switching to principal picture of the meeting is performed simultaneously at both sides by using the means for storing the principal picture of the meeting and the means for displaying the principal picture of the meeting.

(2) When the picture before the meeting are to be displayed, it is implemented by the means for storing the picture before meeting.

(3) Multiple media are displayed with multiple windows according to a required scene by using the means for displaying multiple media with multiple windows and means for storing initially set display positions and sizes of respective media.

(4) Multiple media are displayed with fixed multiple windows according to the progress of the meeting by storing the fixed multiwindow display configuration of multimedia information according to the progress of the meeting.

(5) When communication lines are connected, the picture before meeting is displayed simultaneously on both screens by using the means for automatically displaying the picture before meeting when communication lines have been connected.

(6) In the picture before meeting, it becomes possible to identify the other party by voices and images owing to possession of the means for displaying at least a dynamic picture image together with the means for audio communication. Further, in the principal picture of the meeting, diverse presentation becomes possible by the possession of the means for displaying at least media other than dynamic picture image together with voices.

(7) Owing to the means for storing menu pictures and the means for making menu selection possible, it becomes possible to select such a menu as to inform the terminal that the other party has been identified. Owing to the possession of the means for informing the other party of the selected menu, switching to the principal picture of the meeting is performed in synchronism with the terminal of the other party.

(8) Progress of the meeting is made possible by the means for storing the menu display area controlling common images and the means for storing the displayed menu.

(9) Such a meeting environment as to facilitate manipulation is provided by storing menus for informing the terminal that the other party has been identified, combining these stored menus and displaying the result on the common image display area.

(10) In the scene for identifying both parties before meeting, images inputted at its own terminal are transmitted to the terminal of the other party, and images transmitted from the terminal of the other party are displayed. In the principal picture of the meeting, either images inputted at its own terminal or images inputted at the terminal of the other party are displayed. In case input images are to be displayed at its own terminal, images are automatically switched and displayed so as to meet the progress of the meeting. A convenient environment is thus provided.

BRIEF DESCRIPTION OF THE DRAWING

FIGS. 1(A), 1(B) and 1(C) exemplify displayed pictures according to an embodiment of the present invention;

FIG. 6 exemplifies display menus according to an embodiment of the present invention;

FIG. 7 exemplifies storage of display menus according to an embodiment of the present invention;

FIG. 8 exemplifies preservation of display menus for respective pictures according to an embodiment of the present invention;

FIG. 9 exemplifies storage of menus to be displayed according to an embodiment of the present invention;

FIG. 10 exemplifies contents of processing performed when menus are actually selected according to an embodiment of the present invention;

FIG. 13 exemplifies processing of data inputted via a stylus pen according to an embodiment of the present invention;

FIG. 14 exemplifies a still picture processing apparatus according to an embodiment of the present invention;

FIG. 15 exemplifies command responses of a main body and the still picture processing apparatus according to an embodiment of the present invention;

FIG. 17 exemplifies an input/output control image processing section shown in FIG. 16;

FIG. 18 exemplifies a communication sequence according to an embodiment of the present invention;

FIG. 24 exemplifies conservation of the minutes at the time of picture switching.

DETAILED DESCRIPTION OF THE PREFERRED EMBODIMENTS

An embodiment of the present invention will now be described in detail.

Figure 2:
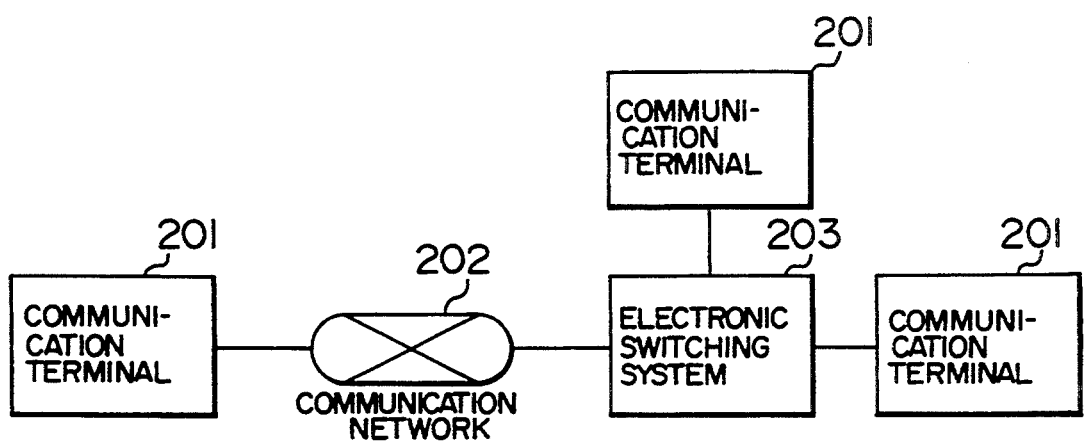
FIG. 2 exemplifies the entire configuration of a system according to an embodiment of the present invention.

FIG. 2 shows an example of a system according to the present invention. Numeral 201 denotes a communication terminal device, and numeral 202 denotes a communication network whereas numeral 203 denotes an electronic exchange. Users of communication terminal devices 201 are connected to various communication media. For example, communication terminal devices 201 are connected to the electronic exchange 203 installed in premises of an office building or a public network existing between premises such as a private line network or an ISDN network to hold a communication meeting among remote locations.

Figure 3:
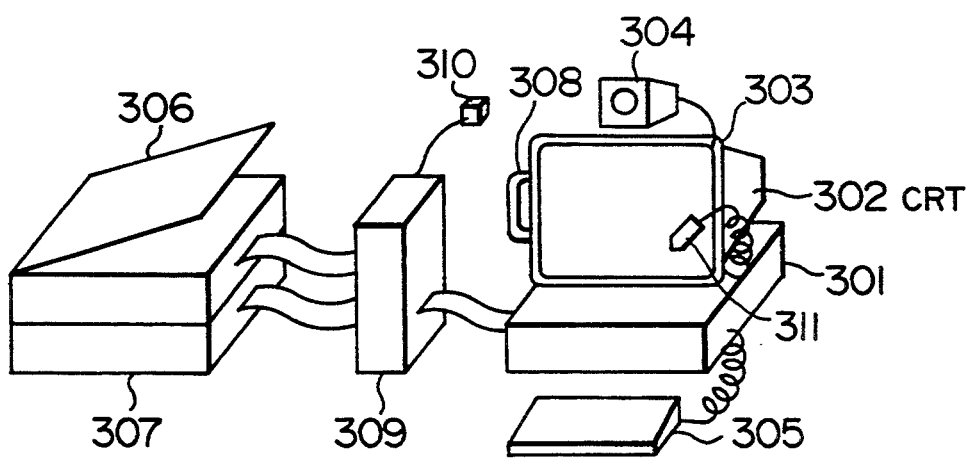
FIG. 3 is an exterior view of a terminal according to an embodiment of the present invention.

FIG. 3 is an exterior view of a terminal device according to the present invention. A general purpose personal computer system is used as a basic component, and hardware for implementing the function of the present invention is added to it. Numeral 301 denotes a main body of the personal computer, 302 a CRT display device, 303 a transparent tablet, 304 a television camera, 305 a keyboard, 306 a scanner, 307 a printer, 308 a handset having a microphone and a loudspeaker, 309 an additional hardware, 310 a plug receptacle for connection to an ISDN network, and 311 a stylus pen. The personal computer main body 301 is a principal processing section for implementing a communication meeting and in charge of operation and administration of the terminal device. The CRT 302 displays full-color still picture documents and dynamic pictures (represented by 8 bits for each of R, G and B and) inputted from the television camera 304 and FAX documents inputted from the scanner 306 as well as menus for advancing the meeting. A menu to be selected is directly selected out of displayed menus by using the stylus pen 311 on the transparent tablet added to the surface of the CRT 302. The keyboard 305 is a device for inputting a document name or the like for administration into a document inputted from the scanner 306 or the television camera 304. Data inputted from the keyboard 305 are converted into Japanese by using Japanese syllabary—Chinese characters conversion function prepared in the personal computer main body 301. The printer 307 is a device for outputting picture data obtained by superposing a drawing inputted via the stylus pen 311 during a meeting on a FAX document inputted via the scanner 306. The handset 308 functions to input and output voices during the meeting. The additional hardware 309 is a hardware used exclusively for substitutingly executing information processing such as processing of full-color still picture documents and FAX documents that the personal computer main body 301 alone cannot afford to process. The ISDN plug receptacle 310 is a connection receptacle for connection to a public network such as an ISDN network. This implements interface (hereafter abbreviated to I/F) based upon or nearly based upon standards with respect to a public network.

Figure 4:
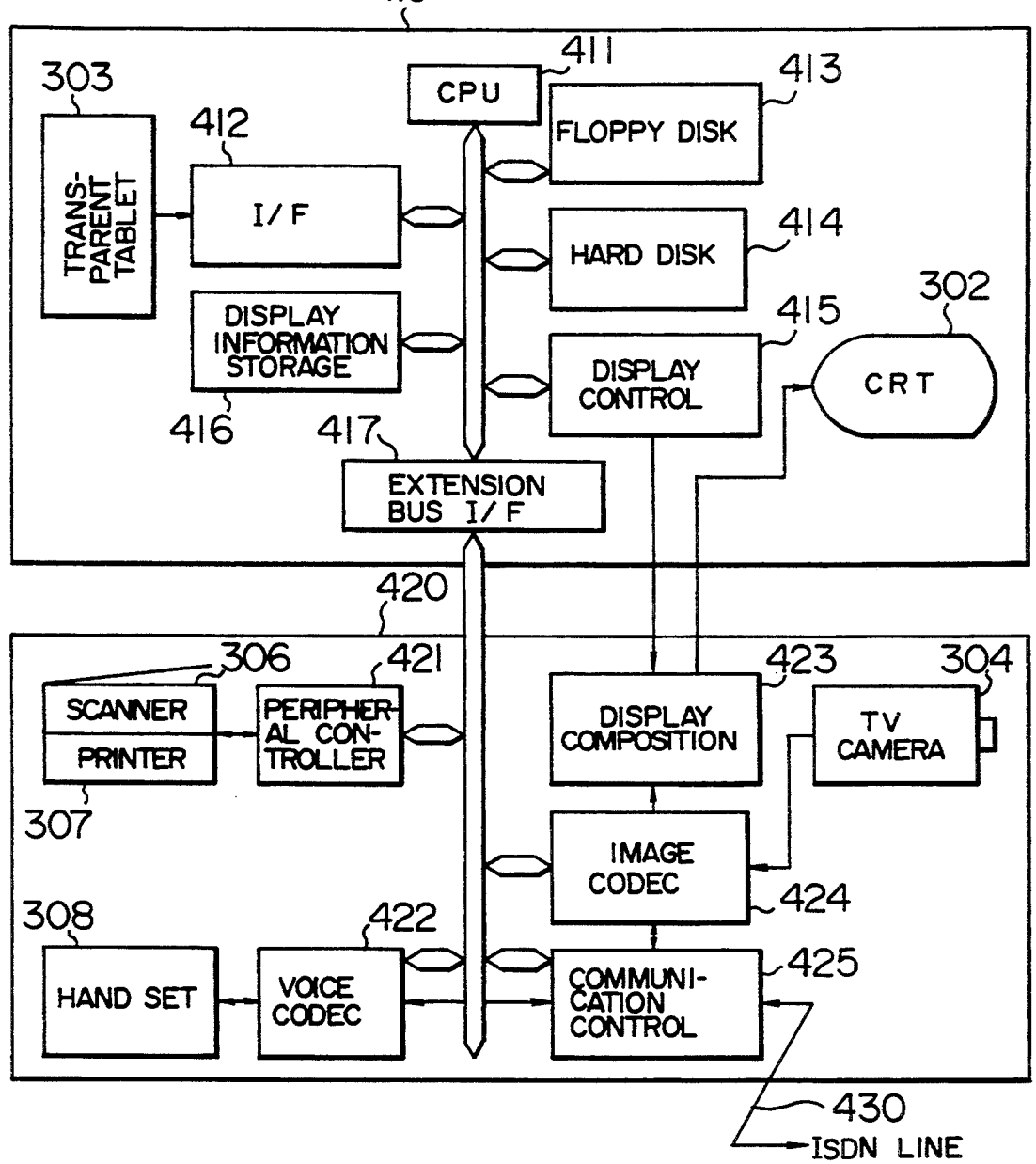
FIG. 4 is a block diagram showing hardware configuration of an embodiment of the present invention.

FIG. 4 is a block diagram showing the entire configuration of a terminal device according to the present invention and is roughly divided into the following two sections. ① Numeral 410 denotes a personal computer section which is a main body of the meeting terminal device. ② Numeral 420 denotes a meeting terminal adapter device which functions as an input/output section of the meeting terminal device main body. In the personal computer section 410, numeral 411 denotes a CPU comprising a personal computer, 412 an RS232C I/F, 413 a floppy disk, 414 a hard disk, 415 a display control section, 416 a display information storage section, and 417 an extension bus I/F for connection to a bus of the meeting terminal adapter 420. In the meeting terminal adapter 420, numeral 421 denotes a peripheral controller, 422 a voice CODEC, 423 a display composition section, 424 an image CODEC, 425 a communication control section, and 430 an ISDN line. In the terminal device as a whole, a multiprocessor scheme is adopted by using the CPU 411 included in the meeting terminal device main body 410 as a principal part thereof. Respective sections included in the meeting terminal adapter device 420 are so connected as to undergo input/output by the CPU 411 and execute independent processing in parallel. The function of the personal computer section 410 and the meeting terminal adapter 420 will now be described. First of all, in the personal computer section, the floppy disk 413 for preserving documents is used to preserve documents which have been used in a meeting together with administration information in operating the meeting such as the date and hour fixed for the meeting and names of participants when the communication meeting has been finished. When meeting materials are produced before the meeting and when additional materials are transferred during the meeting, the floppy disk 413 is used as a document input source together with documents newly inputted via the television camera 304 and the scanner 306. The hard disk 414 is used to store and administer not only documents used in the meeting but also information supplied from the terminal user and the other party of the meeting. The display device CRT 302 of the personal computer in the present embodiment has not capability to deal with full-color data having 8 bits in each of R (red), G (green), and B (blue). In the display control section 415, therefore, FAX documents comprising binary images, pointing to its own drawing inputted from the transparent tablet 303, pointing to a drawing transmitted from the communication control section 425 included in the meeting terminal adapter 420, and menu pictures are combined. Full-color images are generated in the image CODEC 424 included in the meeting terminal adapter 420. On the other hand, image signals of the personal computer and full-color image signals are combined in the display composition section 423 included in the meeting terminal adapter 420. As the display information storage section 416, conventional RAMs for work included in the personal computer are used. Display picture information stored in the display information storage section according to the progress of the meeting is a part of a software program providing an environment of operation of the communication meeting. When this software program rises, the display picture information is read out from the hard disk 414. Thereafter, the display picture information resides in the RAM for work until the above described meeting operation program is finished. The extension bus I/F 417 is a section for connecting the meeting terminal main body 410 to the meeting terminal adapter via an extension slot. The peripheral controller 421 is a section for processing FAX documents inputted from the scanner 306 and it is included in external additional hardware. The peripheral controller 421 performs control of the scanner 306 and the printer 307, NMR coding for preservation and transmission, NMR decoding for redisplaying preserved documents, and development of drawing at the time of printing. As configuration of interface between the meeting terminal main body 410 and the peripheral controller 421, a multiprocessor scheme for implementing firmware in the peripheral controller 421 is adopted. Further, buses connecting between processors are provided with independence and data are exchanged by communication between processors so that those processors may operate independently. The voice CODEC 422 is a device for performing coding and decoding to effect digital transmission of voices. The image CODEC 424 is a device for performing coding and decoding of full-color images, taking in images from the television camera, changing the position and size of images according to the progress of the meeting, and writing data into a frame memory for full-color images included in the image CODEC. By using superimpose, the display composition section 423 combines the output signal of the display control section 415 included in the meeting terminal main body 410 and the output signal of the image CODEC 424 and displays the result. In case N-ISDN is used as the line, for example, the communication control section 425 takes charge of three lower layers of OSI (open systems interface).

In order to enhance the wide use and flexibility of apparatus, the present embodiment has configuration based upon the personal computer. However, an apparatus for exclusive use pursuing the performance and cost may also be used instead. Further, drawing and pointing coordinates are derived from the tablet and the stylus pen in the present embodiment. However, any input device may be used so long as the input device has function of drawing and pointing such as touch pannel, mouse, track ball, joystick, graphics tablet or light pen. The floppy disk 413 is used as a second storage device of a meeting file after the meeting has been finished. However, any device such as an optical disk device or a magnetic tape device may be used instead so long as the device has function of memory and storage. This also holds true for the disk 414 which is used as a first storage device of the meeting file from the time when the meeting materials are produced until the time when the communication meeting is finished. Further, the first storage device may be common to the second storage device. Further, function allotment to the display control section 415 and the display composition section 423 may be freely performed so far as respective processing capabilities permit. Further, the hardware may be single. The CRT 302 uses the single display scheme. From the viewpoint of reduction of hardware of the composition section, however, a plurality of displays such as document display and dynamic picture image display may be used instead. Although the display information storage section 416 comprises a work RAM, it may comprise a ROM in case of an apparatus for exclusive use.

Figure 5:
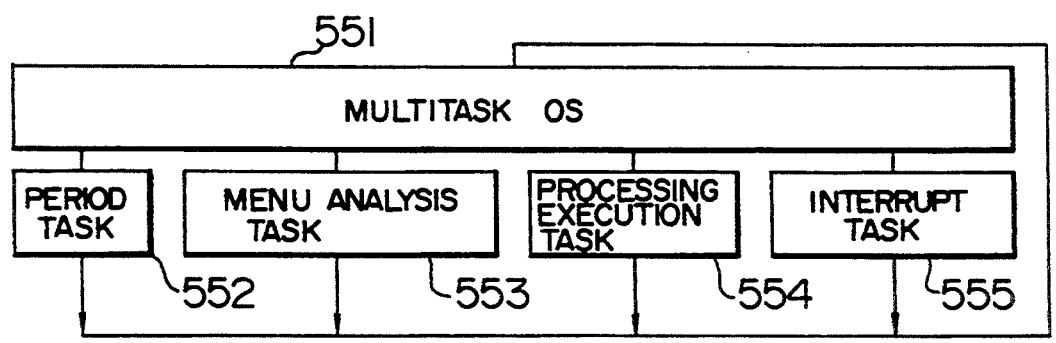
FIG. 5 shows an example of software configuration according to an embodiment of the present invention.

FIG. 5 shows an example of software configuration of the entire telemeeting terminal. Numeral 551 denotes a multitask OS, 552 a period task, 553 a menu analysis task, 554 a processing execution task, and 555 an interrupt task.

In order to make great account of the man-machine interface, a period task having such visual characteristics as to provide men with feeling of natural input and having a raised priority level of processing is provided on the multitask OS 551. Coordinate data inputted from the transparent tablet 303 are taken in at constant periods, and the menu analysis task 553 is started. In the menu analysis task 553, input data are analyzed. If a menu is selected, contents of indicated function meant by the menu is set, and the processing execution task 554 is started. In that task, processing according to the set value is executed. While consecutive processing such as drawing and pointing is being executed, the processing execution task 554 is started as it is. In the processing execution task 554, the value set before continues as it is, and in succession its processing is performed. The interrupt task 555 is a task for executing interrupt processing requested by the meeting terminal adapter 420. There are a processing end notification issued from the peripheral controller 421, the image CODEC 424 and the display control section 415, and processing requests issued from the terminal of the other party via the communication control section, such as a request to transfer processing data into the meeting terminal main body 410.

FIG. 1 shows meeting progress pictures based upon the present invention. FIG. 1 (A), (B) and (C) show a picture 110 before meeting, a principal picture 120 of the meeting, and a picture 130 after the meeting, respectively. In case one terminal is shared by a plurality of users, the principal picture 120 of meeting is not immediately generated on the screen when lines are connected in order to keep a secret, but the principal picture 120 of the meeting is generated on the screen after the screen 110 before the meeting has been generated on the screen. With reference to FIG. 1(A), the picture 110 before meeting is divided into ① a common image display area 111, ② an area 112 for displaying the other party dynamic picture image, ③ an area 113 for displaying its own dynamic picture image and ④ a meeting progress menu display area 114. On the common image display area 111, a meeting start menu 115, a meeting suspension menu 116 and an area 117 for displaying a dynamic picture image for identifying the other party are displayed. The dynamic picture image 119 for identifying the other party is displayed on the display area 117. Its own dynamic picture image 118 is displayed on its own dynamic picture image display area 113.

With reference to FIG. 1(B), the common image display area 111 of the principal picture 120 of the meeting is illustrated as blank. By way of example, however, materials used in the meeting are displayed on the common image display area 111. Further, a dynamic picture image 121 of the other party is displayed on the other party dynamic picture image display area 112.

With reference to FIG. 1(C), a communication end menu 135 and a meeting restart menu 136 are displayed on the common image display area 111 of the picture 130 after meeting.

In a telemeeting terminal for performing communication between remote locations by using multiple media, the other party of the meeting is identified, and when switching to a picture for explaining presented materials (i.e., principal picture of the meeting) is performed. This switching method will hereafter be described in detail.

For convenience, the picture 110 before meeting shown in FIG. 1(A), the principal picture 120 of meeting shown in FIG. 1(B) and the picture 130 after meeting shown in FIG. 1(C) are hereafter referred to as picture 1, picture 2 and picture 3, respectively. In the picture 1, the dynamic picture image 119 of the other party becomes a principal medium for identifying the other party. That is to say, the dynamic picture image of the other party is displayed large in the center of the screen to provide a picture suitable for identification of the other party. In order to check the image transmitted from that terminal device to the other party, its own dynamic picture image 118 may be subsidiarily displayed in the center of the right side of the screen. Further, the meeting start menu 115 and the meeting suspension menu 116 are disposed below the other party dynamic picture image display area 117 shown in FIG. 1(A) to implement the function of smoothly starting the meeting and the function of suspending the meeting when the other party is absent.

The recognition medium for identifying the other party of the meeting is not limited to an image so long as it is a recognition medium peculiar to the other party. For example, the recognition medium may be an ID No., a fingerprint, a voiceprint, a retinal image, or a physical feature. If these are used, the operator need not watch the figure of the other party without fail to identify the other party, but the apparatus may automatically form a judgment. If it is especially necessary for the operator to finally identify the other party to keep a secret, double check comprising a combination of them may also be performed.

Figure 25:
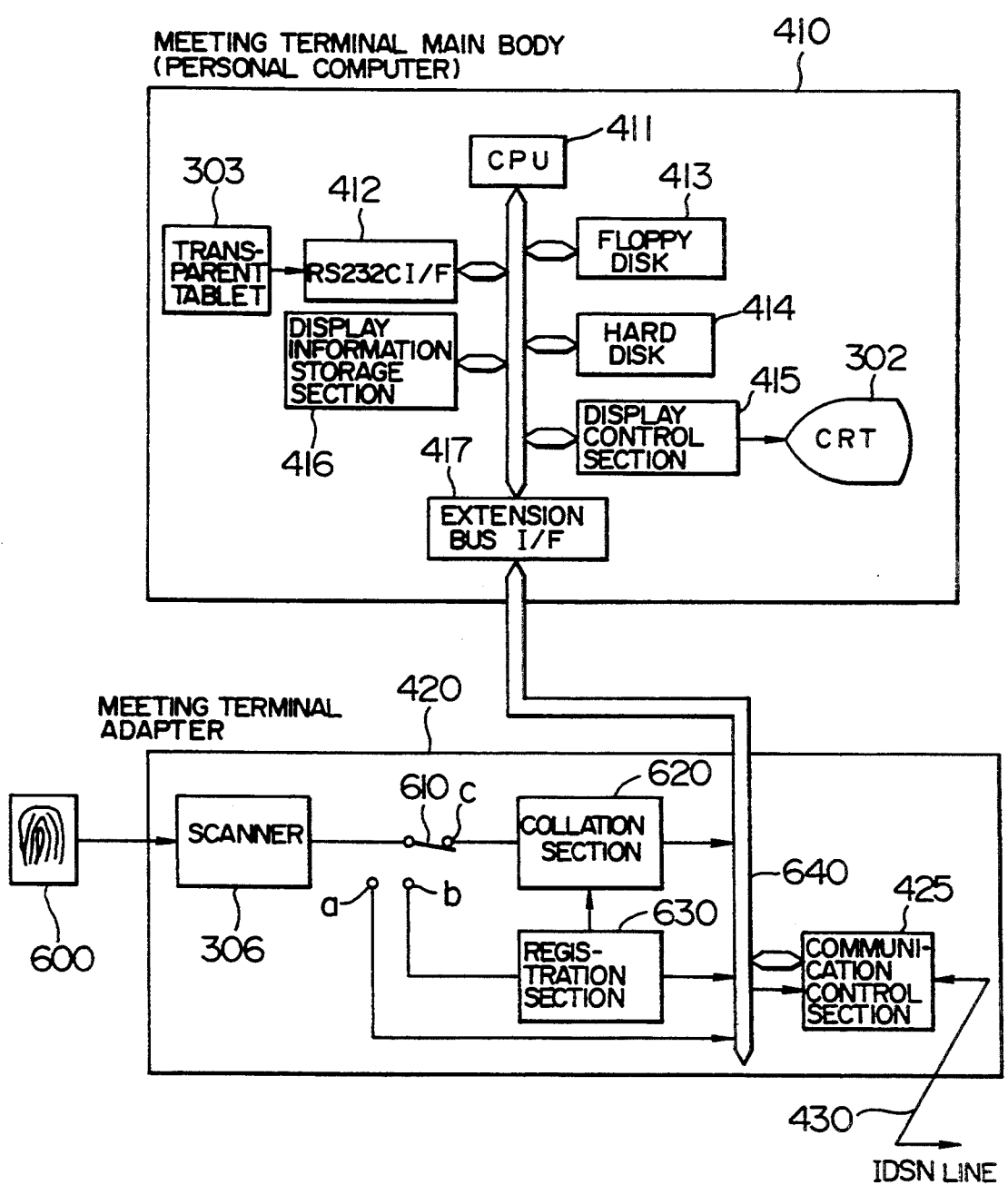
FIG. 25 shows an embodiment of means for identifying the other party of a meeting.

Recognition of such a recognition medium can be implemented by means described below. A case where a fingerprint is used as a recognition medium will now be described by referring to FIG. 25.

① Inputting Fingerprint

For inputting a fingerprint, a scanner input switch 610 is first thrown to position b. A finger is pressed against a press sensor 600. The fingerprint is read by a scanner 306. Fingerprint read information (hereafter referred to as fingerprint information) is transmitted to a registration section 630 and stored therein. On the other hand, fingerprints of participants are thus registered one after another in respective terminal devices. It is a matter of course that fingerprint information thus registered is exchanged via an ISDN line so that registration sections of terminal devices of both parties of the meeting may have identical fingerprint information.

② Receiving Fingerprint Information from the Other Party

When the other party is to be identified, the scanner input switch 610 is thrown to position a and a finger is pressed against the press sensor 60 in the terminal device of the other party. A fingerprint is thus read by the scanner 306 and transmitted to a connection bus 640. The fingerprint information is received by the communication control section 425 of its own terminal device via an ISDN line. The fingerprint information thus received is temporarily stored into a collation section 620 via the connection bus 640.

③ Collating Fingerprint Information of the Other Party

The fingerprint information of the other party stored in the collation section 620 is compared and collated with fingerprint information of all participants of the meeting registered in ①. Collation result information based upon the result is outputted onto the connection bus 640. The CPU of the meeting terminal device main body 410 writes and stores this collation result information into the floppy disk 413 and the hard disk 414. Administration software of the meeting terminal device main body takes over subsequent processing.

The meeting progress menu area 114 will now be described in detail by referring to FIG. 6. In the picture 2, materials are presented and described, where facsimile documents and full-color still picture documents become principal media. Such a medium is displayed on the common image display area 111. In the picture state where materials are described, the other party dynamic picture image 121 and its own dynamic picture image 118 are displayed on the upper right corner of the screen with a smaller picture size than that of the dynamic picture image displayed on the common image display area 111. This aims at enhancing the presentation effect by enhancing presence of meeting between remote locations and giving an explanation while observing the expression of the other party and response to a conversation. On the other hand, the state of meeting is finished by a meeting end menu 512 displayed on the right bottom corner. In the same way as the picture 1, the dynamic picture image 119 of the other party becomes a main medium in the picture 3 as well. The dynamic picture image 119 of the other party is displayed large in the center of the screen to provide a picture suitable for confirmation of the meeting end. At this time, its own dynamic picture image display is being transmitted to the other party. The communication end menu 135 and the meeting restart menu 136 disposed at the bottom of the other party dynamic picture image 119 are selected when smooth end of communication is desired, when communication caused by a menu selection mistake is desired to be finished, or when contents of explanation are suddenly desired to be confirmed in the picture 130 after the meeting. FIG. 6 shows details of the picture 2. Numeral 504 denotes a token ownership display area, and its shaded area indicates possession of a token. The "token" means the right of priority of sending. The "token ownership" means the right of priority in picture switching. Numeral 505 denotes an explanation mode selection menu, 506 a document manipulation menu, 507 a meeting name display and document name selection menu, 508 a page name selection menu, 509 a print execution selection menu, 510 a material transfer selection menu, 511 a presented picture selection menu, and 512 the meeting end selection menu. The presented material display area 501 is an area for displaying a FAX document, a full-color still picture document or the like as described before. The other party person dynamic picture image display area 502 and its own person dynamic picture image display area 503 are areas for displaying person dynamic picture images. The token ownership display area 504 indicates where the right of communication is present, and it is not a selection menu for acquiring the right of token. Transfer of the right of token is automatically performed by action of the user upon the CRT 302. In the following description, stress is laid upon menus for executing explanation. As a result of selecting a menu out of the menus displayed on the meeting progress menu display area 114, the displayed picture is switched. For example, the displayed document is switched from a FAX document to a full-color still picture document. The explanation mode selection menu 505 is used to select a description mode with respect to the displayed document and comprises ① drawing for directly writing a memorandum on the document, ② drawing erasing for erasing a drawing contained in a small movable frame, and ③ pointing for indicating a point of the document to be marked. The document manipulation menu 506 is a menu for changing the display area or the like without changing the displayed document. The document manipulation menu 506 comprises ① scroll for changing the display area, ② electronic memorandum paper for making a specified area of the displayed document white to facilitate description by means of drawing or the like, ③ expansion display menu for displaying a specified area expanded with a fixed ratio as occasion demands, and ④ standard display menu for restoring the state before the expansion display. The present embodiment aims at making the number of times of manipulation performed until execution of menu processing small as far as possible. As for the expansion display, therefore, the area specification scheme with a fixed expansion ratio is adopted. As for the meeting name display and document name selection menu 507 and the page name selection menu 508, the storage structure of documents in the present embodiment is a pyramid structure comprising three stages, i.e. meeting-material-page. Although the menu performed at the present time is unique, there are a plurality of possibilities with respect to documents and pages. For specifying a displayed document (page), a document and a page must be specified. The meeting name display and document name selection menu 507 is so configured to have four columns. The top column displays the meeting name. The second column displays the document name. As for the third column, two left blocks indicate document alteration menus and the right block indicates display document No. / the number of documents. On the fourth column, participants of the meeting and the owner of the displayed document are displayed separately. By selecting a document alteration menu, the first page of a new document is displayed simultaneously at both terminals. The page name selection menu 508 changes over page display in the displayed document. Display is performed by taking four pages as the unit and a page menu to be displayed is selected. Two upper left menus changes over display by taking four pages as the unit. In the menu located below them, the largest page number of the displayed pages is displayed as compared with the total number of pages.

The print selection menu 509 is a menu for printing out the document which is being displayed. The material transfer selection menu 510 is a menu for transferring a material which has suddenly become necessary during a meeting. In order to enhance the explanation capability in conformity with the above described document display, the presented picture selection menu 511 such as electronic blackboard and camera picture comprises an electronic blackboard menu for clearing the whole of the common image display area 111 (presented material display area) so that it may become white and explanations may be added there, and a camera picture menu for displaying dynamic picture images and directly displaying a solid body, a mock-up model and the like. The principal picture of the meeting is finished by the meeting end selection menu 512. It is the user's intent to finish the meeting by selecting this menu. At that time, however, switching to the picture after meeting set by the terminal side as the progress scene of the meeting is automatically performed.

Succeedingly, switching of displayed picture performed by the terminal according to the progress of the meeting will now be described in detail. First of all, as for the picture display method at the time when the display picture No. is defined, switching of the displayed picture in FIG. 1 will now be described. If menu selecting coordinates are inputted by a stylus pen, it is checked whether the inputted coordinates are within the range or not for each of menus of the displayed picture. At this time, there are two methods. In one method, menu contents are individually stored for each picture. In the other method, when there are menus common to pictures, each picture has bit information representing the presence/absence of menus with respect to the list of menus in order to reduce the amount of information. In the present embodiment, the latter method will be described. FIGS. 7 to 10 show the present invention. FIG. 8 shows an example of preservation of display menus for respective pictures. For each picture, displayed menus are preserved with respect to the list of selection menus. In the drawing, "1" represents presence of display whereas "0" represents absence of display. As shown in the drawing, selection menus are dealt with as numericals corresponding thereto throughout all drawings. The display contents are stored separately by taking selection menu No. as the unit as shown in FIG. 7. It is now assumed that menu selection is performed by a stylus pen in the picture 1, for example. With reference to FIG. 9, selection menus are successively searched beginning from the selection menu No. 1. If bit "1" is found, it is checked whether inputted coordinates are within the pertinent menu area or not by referring to FIG. 8. If inputted coordinates are within the menu area, that menu area is selected.

FIG. 10 shows an example of preservation of processing contents performed when menus are actually selected. If the selection menu No. 1 is selected in the picture 1, for example, switching to the screen 2 is performed. As for the display of switched pictures, a menu to be displayed is searched by referring to FIG. 9 and an area to be displayed is derived by referring to FIG. 8 whereas concrete display contents are derived by referring to FIG. 7. Display picture switching is thus performed according to the progress of meeting.

As for the menu selection method, a stylus pen, for example, is used.

Figures 11, 12:
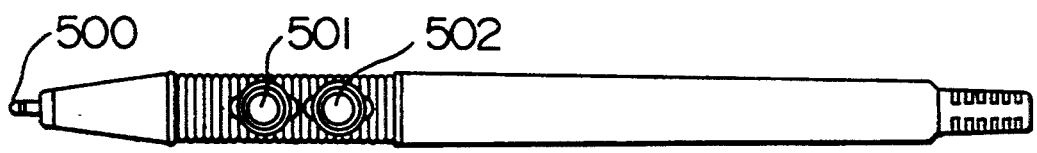
FIG. 11 exemplifies data inputted from a stylus pen according to an embodiment of the present invention.
FIG. 12 is an exterior view of a stylus pen according to an embodiment of the present invention.

FIG. 12 is an exterior view of a stylus pen. The stylus pen has a main switch 500 for defining actual inputted coordinates and two subswitches 501 and 502 used to reflect the user's selection intent. FIG. 11 shows an example of data inputted via the stylus pen according to the present invention. One coordinate includes five bytes. The first one byte is used to derive switch information of the stylus pen. Effective distance data represented by PX is used to judge whether the distance from the main switch 500 to the tablet surface is within a predetermined distance (3 to 5 mm) or not. The second to fifth bytes are binary number representation of the X coordinate and the Y coordinate. In a scheme generally used as the menu selection method, menu selection becomes effective when either the subswitch 501 or 502 is pressed under the state that the main switch 500 is on. For making manipulation simpler, menu selection is herein attained by simply turning on the main switch 500. The following problems are posed at this time. ① In case the user keeps the main switch on, a menu located in the same area of the switched picture is selected. ② If an explanation such as drawing comes in the menu area of the picture 2 shown in FIG. 1, this menu is selected. FIG. 13 shows an example of solution to the above described problem according to the present invention. On the ordinate, mode 0 and mode 1 are provided. Switching between the mode 0 and the mode 1 is performed by state values including values of the main switch SW1 and PX indicated on the abscissa. PX denotes information representing whether the distance is within the effective area or not. SW1 denotes information representing ON/OFF of the main switch.

"Within menu area" indicated for the states 4 and 5 indicates that the inputted coordinate value is within an area shown in FIG. 8 and an area specified by FIG. 9. The concrete state switching method will hereafter be described. When the displayed picture is switched by menu selection, the mode is set at 0. Since a menu is selected by the input of the main switch at this time, state 5 is established. When the stylus pen gets out of the effective distance in the state of mode 0, the mode is set at 1 as shown in FIG. 13. Menu selection is not allowed until this time. When the stylus pen is within the effective distance and the main switch is on in the mode 1, its inputted coordinates are judged. If the inputted coordinates are not within the menu area at this time, menu selection processing is not performed but the meeting operation program sets the mode at 0. If the inputted coordinates are within the menu area, menu processing including picture switching is performed and thereafter the mode is set at 0. Smooth menu selection is implemented by using the main switch alone as heretofore described.

The description heretofore given relates to menu display. At the same time, one's own dynamic picture image and the dynamic picture image of the other party must be displayed in the picture 1 and the picture 3, whereas one's own dynamic picture image, the dynamic picture image of the other party and a document to be described must be displayed in the picture 2. The display control method will hereafter be described. First of all, full-color image display will now be described. A typical full-color image needs 8 bits for each of R, G and B and hence needs 24 bits in total. In a typical personal computer, the processing capability and the display capability are insufficient. As described before with reference to FIG. 4, an external device of the personal computer performs processing and display, whereas the personal computer main body controls its operation. FIG. 14 shows an example of configuration of full-color image display hardware according to the present invention. FIG. 14 shows the image CODEC section in further detail. Numeral 1401 denotes an input-/output buffer for the personal computer, 1402 an input-/output buffer for the communication control section, 1403 a CPU for controlling the whole of the image CODEC, 1404 a coding/decoding device for dynamic picture image and full-color still picture, 1405 an output frame memory, 1406 an input frame memory, and 1407 a section for converting an analog signal inputted from the TV camera into a digital signal. The display section is switched according to a request issued from the personal computer. The display control method of full-color images shown in FIG. 1 will hereafter be described.

First of all, the dynamic picture image of the other party person in the picture 1 will now be described. Dynamic picture image code data inputted from the communication control section 425 are taken in via the input/output buffer 1402, decoded by the coding/decoding device 1404 for dynamic picture image and full-color still picture, and written into the output frame memory 1405. The display composition section 423 is so controlled by a display changeover control signal supplied from the CPU 1403 that the written image signal may be combined with a personal computer signal and displayed. At the time of composition in displaying the dynamic picture image of the other party person, superposition of the dynamic picture image and the personal computer signal is not performed with due regard to the dynamic picture image, but only the dynamic picture image is displayed. Succeedingly, the dynamic picture image of one's own person in the picture 1 is inputted from the TV camera 304. An NTSC signal, for example, undergoes analog-digital conversion in the A-D conversion section 1407 and is written into the input frame memory 1406. The image data written into the input frame memory 1406 is written into the output frame memory 1405 by the coding/decoding device for dynamic picture image and still picture. Display is performed in the same way as the dynamic picture image. The picture used for explaining a material in the picture 2 will now be described. As for the person dynamic picture image, the input/output method is identical although the size and the display position of the dynamic picture image of the other party person are different and processing of the dynamic picture image of the other party in the coding/decoding device for dynamic picture image and still picture is slightly different. As for the processing of dynamic picture image of the other party in the picture 1 and the picture 2, there are two methods as embodiments. In one method, the same processing is performed for input from the TV camera 304 and coding/decoding of the dynamic picture image and still picture in the coding/decoding device 1404 whereas the size and position are changed depending upon whether the picture is picture 1 or picture 2 when the dynamic picture image is written into the output frame memory 1405. In the other method, the size is changed at the time of input and coding, and the display position is changed when the dynamic picture image is written into the output frame memory 1405. A case where a full-color still picture is displayed as a presented material of the picture 2 will now be described. Since the full-color still picture document is preserved in the hard disk 414 of FIG. 4 as code data, it is first read out into the personal computer, and then taken into the image CODEC 424 via the extension bus I/F 417 and the input/output buffer 1401. In succession, the full-color still picture document is decoded by the coding/decoding device 1404 for dynamic picture image and still picture and written into the output frame memory 1405. As for the operation of the display composition 423 at this time, there is a method of displaying only the full-color still picture document without combining it with the personal computer signal in the same way as the case of dynamic picture image display. In order to comply with a request that the full-color still picture document should undergo correction and retouch by means of drawing and the position of explanation should be indicated by means of pointing, however, this information is stored in the display control section 415 of the meeting terminal main body 410 and superimposed over the full-color still picture document in the display composition section. In case a full-color still picture is displayed in the picture 2 of FIG. 1, therefore, only the full-color image signal is displayed in the dynamic picture image section, and the personal computer signal is so displayed in the full-color still picture image section as to be superimposed over the full-color image signal whereas only the personal computer signal is displayed in the meeting progress menu display area 114. This switching is implemented by storing patterns associated with picture Nos. and display contents in the display composition section and specifying a pattern by means of the display changeover control signal supplied from the CPU 1403. The above described display changeover specification supplied from the CPU 1403 is executed upon receiving specification supplied from the personal computer main body 410 to the image CODEC 424. FIG. 15 shows an example of command and response specifications at this time. A command code corresponding to a display picture is supplied from the personal computer main body 410 to the image CODEC 424. In case of the full-color still picture document display, code data is also supplied from the personal computer-main body 410 to the image CODEC 424. When processing is finished in the image CODEC, a response code is returned to the personal computer main body 410.

Figure 16:
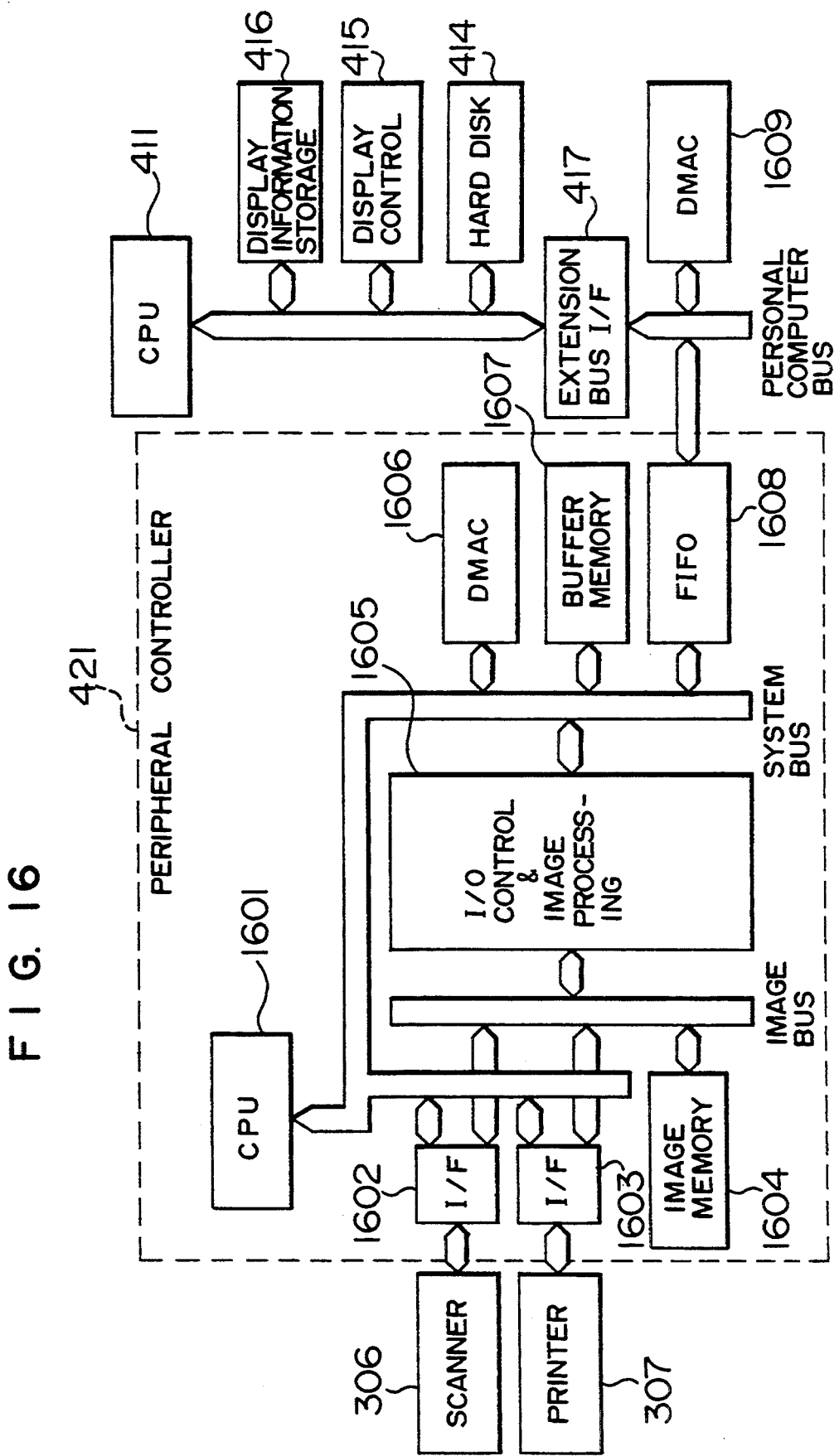
FIG. 16 exemplifies a FAX document processing apparatus according to an embodiment of the present invention.

Succeedingly, details of the FAX document display processing will now be described. FIG. 16 shows the entire configuration regarding the FAX document processing. Numeral 1601 denotes a CPU of the peripheral controller, 1602 an I/F for the scanner 306, 1603 an I/F for the printer 307, 1604 an image memory, and 1605 an image processing section for performing input/output control of the scanner and printer, coding/decoding of the FAX document and compression. Numeral 1606 denotes a direct memory access (DMAC), 1607 a buffer memory, 1608 a two-way FIFO, and 1609 a DMAC. The scanner 306 and the printer 307 are the same as those of FIG. 3. The CPU (personal computer) 411, the display control section 415, the hard disk 414, the extension bus I/F 417, the peripheral controller 421, and the display information storage section (image memory) 416 are the same as those of FIG. 4. As for the flow of FAX document processing as a whole, a document inputted from the scanner 306 undergoes coding processing in the peripheral controller 421 and stored in the hard disk 414. At the time of display, the document is read out from the hard disk 414, decoded in the peripheral controller 421, and thereafter transferred to the display information storage section 416. A portion to be displayed is transferred to the display control section 415. The display method will hereafter be described in detail. If the FAX document display is specified in the picture 120 by selecting the page name selection menu 508 of FIG. 8, code data of the specified document is searched in the hard disk 414 and taken into the display information storage section 416. Thereafter, the code data is decoded in the peripheral controller 421. At this time, notification of an event between the personal computer CPU 410 and the peripheral controller 421 is performed by an interrupt. Independent operation of the personal computer CPU 411 and the peripheral controller CPU 1601 is thus realized. Further, in order to increase the data transfer rate, data transfer on the personal computer bus is administered by the exterior DMAC 1609 and data transfer on the system bus is administered by the DMAC 1606. At the time of decoding, the personal computer requests for decoding and the code data is transferred to the buffer memory 1607 in accordance with the above described method. Then the code data is transferred to the input/output control and image processing section 1605 by the DMAC 1606 and decoded therein. The result of decoding is developed into the image memory 1604, and the personal computer is informed of the end of processing. Succeedingly, full-scale transfer or compression transfer is requested by the personal computer. Full-scale data or compressed data is read onto the system bus by the input/output control and image processing section 1605 and stored into the buffer memory 1607 by the DMAC 1606. When storage of data into the buffer memory 1607 has been finished, transferrable communication interrupt is performed with respect to the personal computer. Thereafter, data are read out onto the personal computer bus via the FIFO by using the DMAC 1606. Upon receiving the transferrable communication interrupt, the personal computer sets the quantity of transferred data into the DMAC 1609 and starts it. As a result, data is transferred to the display information storage section 416. Finally, a portion to be displayed is transferred to the display control section 415.

FIG. 17 shows an example of configuration of the input/output control and image processing section 1605.

Each of numerals 1701 and 1703 denote a DICEP-A (document image compression and expansion processor-advanced). Numeral 1702 denotes an ACRTC (advanced CRT controller). Numeral 1704 denotes a compression circuit. The DICEP-A 1701 is an LSI exclusively for coding and decoding the MMR (modified modified read) code, which complies with the international standards coding scheme of FAX documents, available from Hitachi Ltd. and executes data transfer on the image bus at the same time. The ACRTC 1702 is an LSI exclusively for displaying graphics and characters on a scanning CRT available from Hitachi Ltd.. The compression circuit 1704 is a circuit exclusively for executing compression of a FAX image with a ratio of $\frac{1}{2}$ in the longitudinal and lateral directions. As for the processing contents of respective sections, the DICEP-A 1701 performs printer output control of the image memory, and the ACRTC 1702 performs development processing upon drawing data transmitted from the personal computer at the time of printer output. The DICEP-A 1703 controls inputting from the scanner 306 to the image memory 1604, exercises MMR decoding over data of the image memory 1604 to output it to the system bus, and exercises MMR decoding over MMR code data transmitted from the personal computer 410 to develop it into the image memory 1604. Further, when data of the image memory 1604 is to be transmitted as it is to the personal computer 401, the DICEP-A 1703 takes data out and outputs it to the system bus. The compression circuit 1704 compresses data of the image memory 1604 and outputs the result to the system bus.

The display method of a FAX document on the display will now be described. In order to deal with an A4 full-size document in the terminal, 2376×1728 pixels are demanded. A display having typical dimensions in both longitudinal and lateral directions cannot provide a sufficient number of pixels. Unless a special display is used, the entire sheet of the document cannot be displayed. In case of partial display, scroll in the horizontal direction becomes necessary, resulting in significant inconvenience. In case of compression display, permissible image quality for a document cannot be maintained unless the compression ratio is limited to approximately $\frac{1}{2}$. As an embodiment, the case where a high resolution display (750×1120) in a typical personal computer is used will now be described. If an A4 full-size document is compressed to half in the longitudinal and lateral directions, 1188×864 pixels are required and hence full-size display in the lateral direction becomes possible. Usually, therefore, images compressed to half in the longitudinal and lateral directions are displayed, and full-size images are displayed as occasion demands. At this time, full-size data is as large as approximately 500 KB in data quantity, resulting in long transfer time to the personal computer. Even if the full-size data is transferred, a larger part thereof is not displayed. In an embodiment, therefore, the full-size data is stored in the image memory of the peripheral controller 421, and a portion thereof to be displayed is transferred to the personal computer side as occasion demands and stored into the display information storage section 416 in the personal computer.

The reason why such configuration is adopted will now be described. Firstly, the transfer rate is approximately 125 KB and hence the transfer load is not so heavy. Secondly, the above described configuration lowers frequency in use of the extension bus of the personal computer, which is used to implement high-speed scroll in the longitudinal direction in a race with other additional hardwares such as the image CODEC 424 and the communication control section 425.

Exchange of communication data in switching of meeting pictures will now be described in detail. FIG. 18 shows an example of its communication sequence. Data exchanged between the transmitting side (B) and the receiving side (C) are shown in area (A). Display pictures and user's action are shown in the transmitting side (B). Display pictures are shown in the receiving side (C). In the beginning, local pictures are displayed on both sides. When the meeting execution menu is selected at the terminal on one side, a line connection request for connecting lower layers of the OSI is issued. The receiving side returns an answer. The succeeding communication start request is a request for connection of a session layer of the OSI, and the communication start answer is an answer representing the session layer connection. Connection is thus performed up to the session layer, and the picture before meeting represented by picture 1 of FIG. 1 is displayed on both sides. When the meeting suspension menu is selected in the picture before meeting, a communication suspension request is issued as a request for opening the session layer, and a communication suspension answer is returned as the answer thereto. A line opening request is then issued as a request for opening the lower layer, and a line opening answer is returned in response thereto. The line is opened thereby, and pictures of both sides automatically return to local pictures. When the meeting start menu is selected in the picture before meeting, a meeting start request equivalent to the session activity start request is issued. A material prepared beforehand is automatically displayed on both screens. That is to say, a material presenting and explaining picture represented by the picture 2 of FIG. 1 is automatically displayed. Explanation is advanced by using menus located at the bottom of the picture 2. When the explanation is finished, a meeting end request corresponding to the session activity end request is issued. Upon receiving confirmation of session activity end, the meeting after meeting represented by the picture 3 of FIG. 1 is automatically displayed on both screens. When the meeting restart menu is selected in the picture after meeting, a meeting restart request corresponding to the session activity resume request is issued and principal pictures of meeting are restored in both screens. When the communication end menu is selected in the picture after meeting, a communication end request including the session release request is issued. In response thereto, a communication end answer is returned. In succession, the line opening request, which is a request to release lower layers, is issued. In response thereto, the line opening answer is returned, and the line is opened. Local pictures are automatically restored in both screens.

Figure 19:
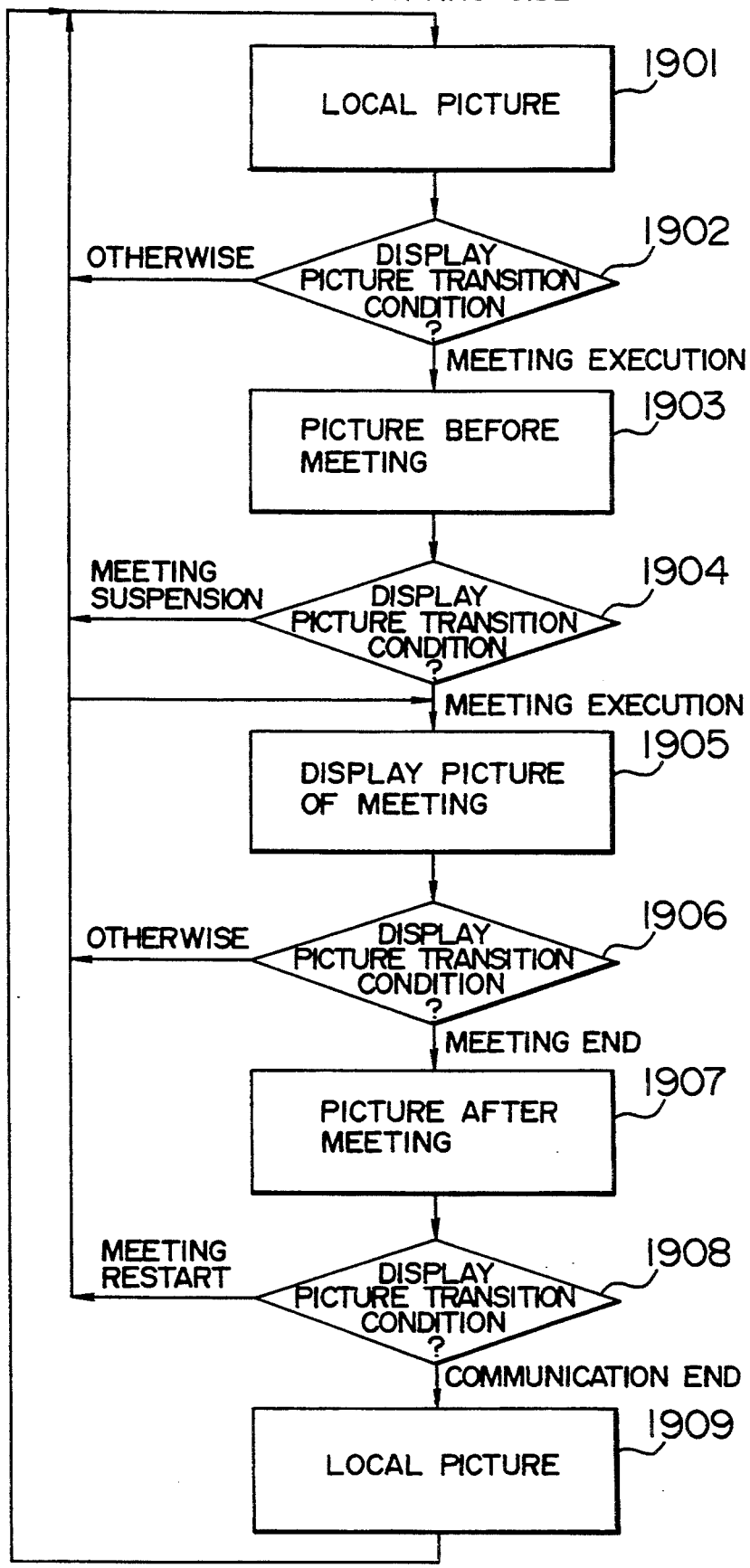
FIG. 19 is a flow chart of picture switching caused at the transmitting side by menu selection according to an embodiment the present invention.

FIG. 19 shows an example of switching of pictures at the transmitting side. Displayed pictures and switching of them are shown. Numeral 1901 denotes a local picture, and numeral 1902 denotes a display picture switching condition in the local picture 1901. Numeral 1903 denotes a picture before meeting, and numeral 1904 denotes a display picture switching condition in the picture 1903 before meeting. Numeral 1905 denotes a principal picture of the meeting, and numeral 1906 denotes a display picture switching condition in the principal picture of the meeting. Numeral 1907 denotes a picture after meeting, and numeral 1908 denotes a display picture switching condition in the picture after meeting. Numeral 1909 denotes a local picture.

Figure 20:
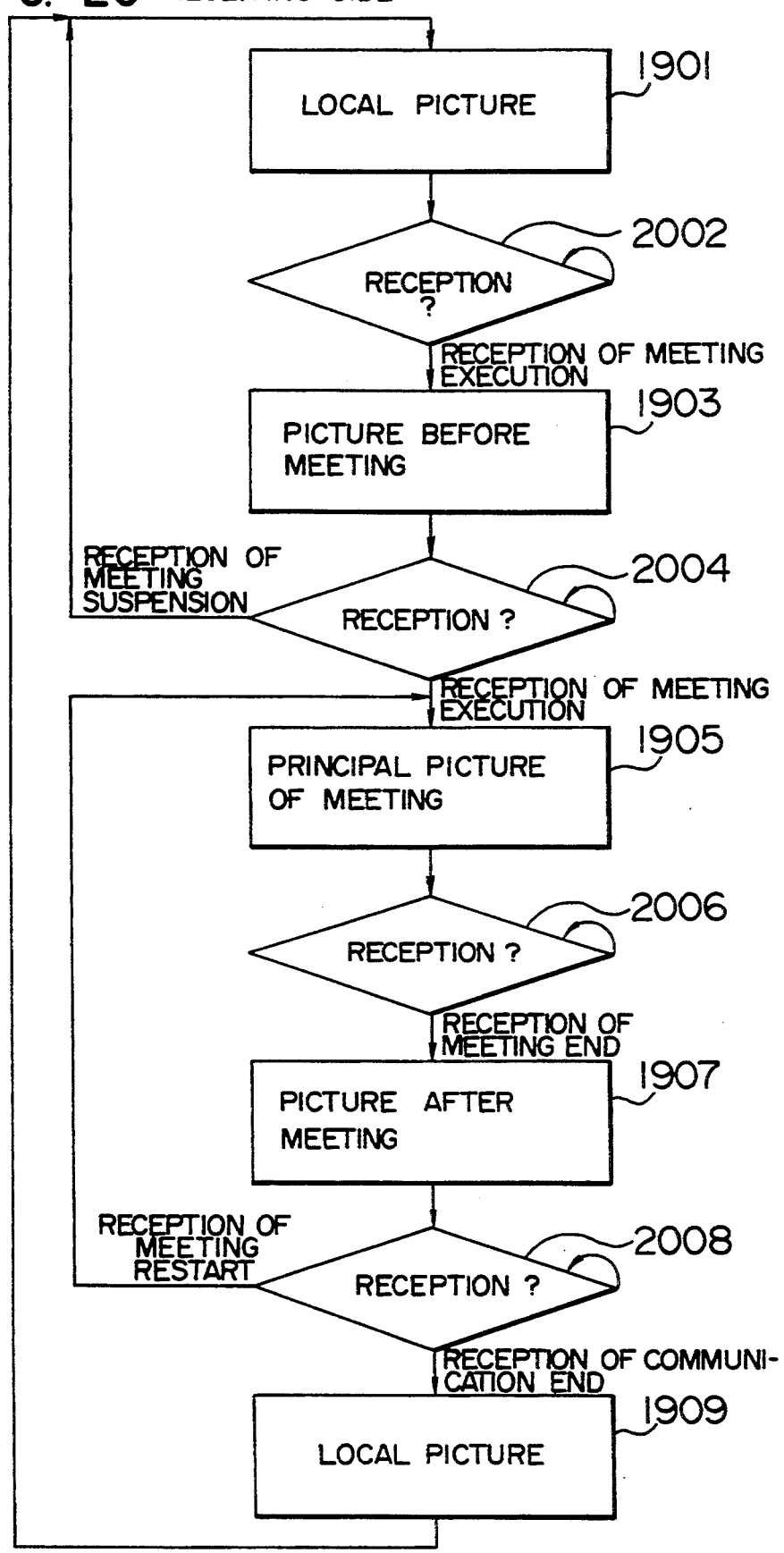
FIG. 20 is a flow chart of picture switching caused at the receiving side by menu selection according to an embodiment of the present invention.

FIG. 20 shows an example of switching of pictures at the receiving side. Displayed pictures and switching of them are shown. Numeral 2002 denotes a picture switching condition in the local picture. A closed switching arrow indicates that wait state is kept until meeting execution is received. Numeral 2004 denotes a picture switching condition in the picture before meeting. Numeral 2006 denotes a picture switching condition in the principal picture of meeting. Numeral 2008 denotes a picture switching condition in the picture after meeting.

Switching of pictures are illustrated separately for the transmitting side and the receiving side. In an arbitrary picture, however, the terminal may become either of the transmitting side and the receiving side.

In such a communication meeting that an identical document is displayed on both displays (i.e., matching is taken) and explanations are given, materials of both sides must be so matched before the start of explanations that documents are uniquely specified by identifiers. Such a method that this matching is taken in the material presenting and explaining picture is conceivable. In order to allow concentration of mind upon explanations in meeting, materials used in the meeting are herein matched each other in the picture before meeting. Preferably, materials are automatically matched while the user is greeting by dynamic picture images and voices.

In case minutes are to be produced in the picture after meeting, the minutes may be automatically produced by the terminal side in accordance with a format prepared beforehand by the terminal side or the minutes may be produced in accordance with user's input. Minutes will be described later by referring to FIG. 24.

In the embodiment shown in FIG. 1, switching between meeting pictures is automatically performed by menu selection. However, the present invention is not limited to this. Such a method that meeting pictures are automatically switched in accordance with preset time may be adopted. At this time, provision of function of informing the user that the preset time has elapsed is a convenience to the user. Further, by provision of function of allowing the user to extend the preset time, use which is not limited by the preset time becomes possible.

In the above described embodiment, common pictures are used throughout the meeting. However, there is many-sided use allowing local working during the meeting by configuration including both a window having display contents changed over in accordance with the progress of the meeting and a window having display contents changed locally irrespective of the progress of the meeting. By so configuring the system at this time that the window having display contents changed in accordance with the progress of the meeting can be manipulated by a directive on the window having display contents changed locally, slippage in display synchronization of common image display pictures can be prevented. Further, by automatically, displaying the local window having display contents which are not changed with the progress of the meeting in response to a directive given on the window having display contents changed in accordance with the progress of the meeting, it becomes possible to make processing having a large amount of contents local working and thereby prevent slippage in display synchronization.

The present embodiment relates to a point to point communication meeting. In case communication meeting among three or more points is allowed and participation in the course of the meeting is allowed, configuration having at least a principal picture of meeting and a picture for displaying greeting of a person newly participating in the course of meeting (i.e., a picture for identifying a person participating in the course of meeting) is effective in keeping a secret as described later. By displaying at this time at least a dynamic picture image together with voices in the picture for displaying greeting of a person newly participating in the course of meeting and displaying at least a medium other than a dynamic picture image together with voices in the principal picture of meeting, it becomes possible to surely identify the other party. Further, by performing document matching during the display of the picture for displaying greeting of a person newly participating in the course of meeting, natural meeting participation can be realized. Further, in case secession in the course of the meeting is allowed, configuration having at least a principal picture of meeting and a picture for displaying greeting of a person seceding in the course of the meeting is effective in realizing a natural meeting environment. By displaying at this time at least a dynamic picture image together with voices in the picture for displaying greeting of a person seceding in the course of the meeting and displaying a medium other than a dynamic picture image together with voices in the principal picture of meeting, it becomes possible to provide an environment similar to an ordinary interview meeting.

In the present embodiment, the meeting progress pattern is prepared beforehand at the terminal side. It is effective that the user has a capability of registering the meeting progress pattern so that setting complying with needs may be performed. Further, it is effective at this time to implement such configuration that an arbitrary scene using multiple media can be set, registered and operated.

Further, in the present embodiment, terminals of both sides are on the same footing. By so configuring a communication meeting among two or more points that the right of communication may be moved by a terminal having leadership of communication as described later, it becomes possible to lighten the load of the terminal and provide environment similar to an ordinary meeting having chairman.

A person so defined before the start of a meeting as to participate in it is automatically allowed to participate in the meeting at the person's wish. In case a person is newly called out to participate in the meeting as occasion demands, the person thus called out is identified and thereafter the person participates in the meeting. In case communication among multiple points is realized, it is effective in keeping a secret to thus distinguish the situation of the participant.

Figure 21:
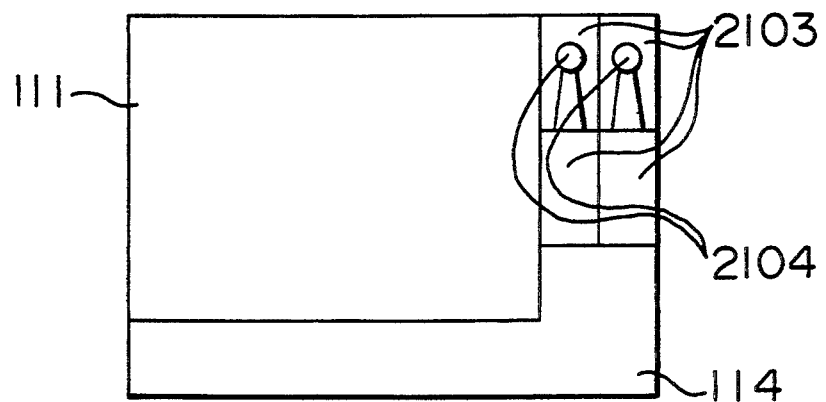
FIGS. 21 to 23 exemplify pictures displayed according to the present invention in case meeting is held between two locations or more.

FIG. 21 shows an example of display picture obtained when a meeting among two or more points is held. Numeral 2103 denotes a participant dynamic picture image display area. Numeral 2104 denotes a participant dynamic picture image. As compared with the principal picture 120 of FIG. 1, the portion for displaying person dynamic picture images has been changed to comply with multiple points. As for the midway participation method during execution of the meeting, the following two methods are possible. The first method corresponds to the case where a person so defined beforehand as to participate in the meeting participate in the meeting part-way. The second method corresponds to the case where a person is urged to participate in the meeting part-way and tell opinion as occasion demands.

Figure 23:
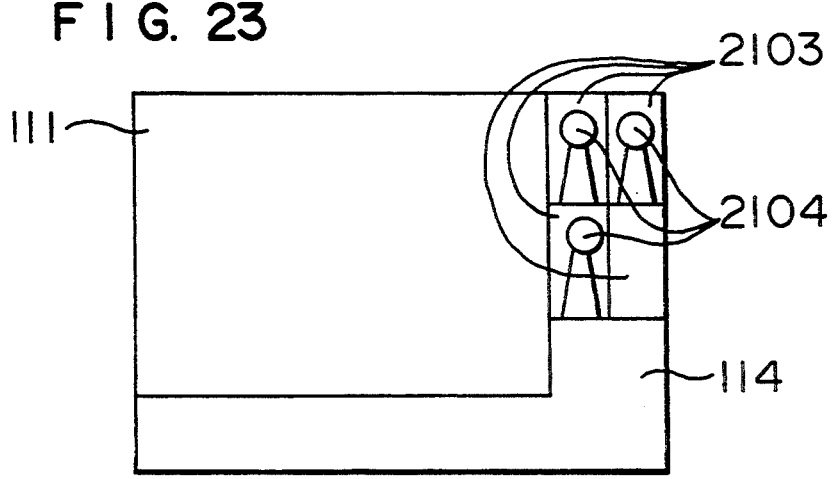

In case a person so defined beforehand as to participate in the meeting participate in it part-way, the above described first method automatically matches meeting materials and allows automatic switching to the principal picture off meeting as shown in FIG. 23 at the person's wish.

In case a person is urged to participate in the meeting part-way in accordance with the second method, suddenly switching to the principal picture of the meeting as in the first method poses a problem in keeping a secret because the person to be called out is not necessarily on the screen.

Figure 22:
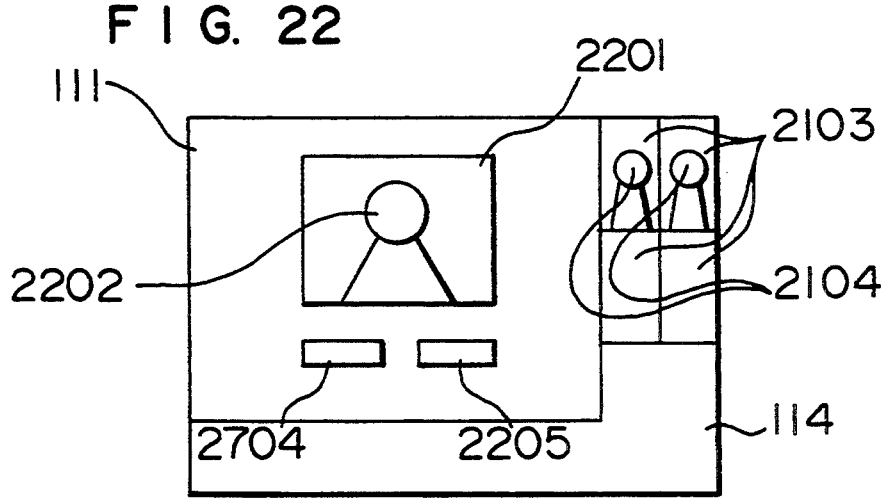

FIG. 22 shows a picture for identifying a midway meeting participant. Numeral 2201 denotes a dynamic picture image display area for identifying midway participant. Numeral 2202 denotes a dynamic picture image for identifying midway participant. Numeral 2204 denotes a participation consent menu. Numeral 2205 denotes a participation cancel menu. When it becomes necessary to identify the other party of the meeting in the course of the meeting, the other party is called out, and switching to this picture is automatically performed when lines are connected. In case the other party is identified in this switched picture by means of the midway participant identifying dynamic picture image 2202 and voices, the participation consent menu 2204 is selected and switching to the picture of FIG. 23 is automatically performed. On the other hand, in case the other party is absent, the participation cancel menu is selected. The line is automatically released and, the picture of FIG. 21 is restored.

Further, in some cases of communication among multiple points, some of the participants do not take part, but desire to merely watch the meeting. In such a case, it is desirable that the communication network 202 or the electronic exchange 203 administer separately telemeeting terminals taking part is meeting progress and capable of switching display pictures and telemeeting terminals which do not take part in meeting progress and which share the picture. In not only this case but also cases where communication in performed among a large number of points, connecting terminal devices in a ringlike network causes degraded real time property and increase in load of telemeeting terminals. In these cases, therefore, it is desirable that the electronic exchange 203 or the communication network 202 has additional function for exercising centralized control and starlike network configuration is used.

With reference to FIG. 6, selecting the page name selection menu 508 or the like changes the display of the common image display area 111 and switches pictures. It is conceivable to provide means for preserving minutes in the picture at the time of switching. FIG. 24 shows an example thereof. Numeral 2401 denotes a document, 2402 page 1, 2403 page n, 2404 block 1, 2405 block 2, 2406 text unit 1, 2407 text unit 2, and 2408 text unit 3. Each material typically has a hierarchical structure ranging from document to page. In the initial state, page 1 is located under the document 2401 (pages 2 to n are not considered) and the text unit 1 which is actual code information of the document is located under page 1. When the displayed page is changed over, one's own drawing data and drawing data of the other party on that page are preserved as minutes. To be concrete, drawing data actually drawn by a person oneself and drawing data actually drawn by the other party are so preserved respectively under the block 1 indicating that it is one's own drawing data and under the block 2 indicating drawing data of the other party as to be associated with page 1. This data preservation form is based upon layout structures in ODA (office document architecture) are ODIF (office document interchange format).

The token ownership display area 504 was described before with reference to FIG. 6. It is effective in strengthening a sense of security to display whether the right of token is present or not, which represents whether the right of token is present or not, on a part of the screen. As for transfer of the right of communication, it is conceivable to transfer the right of communication by selecting a token right display area defined as menu. However, it is inconvenient to the user to make the user conscious of the right of token which is the concept peculiar to the communication technique. Therefore, it is desirable that the right of token is moved when the user takes action needing the right of token (such as alteration of display page). In the above described embodiment, the right of token is needed for every manipulation in progress of meeting. For specific media communication such as drawing and pointing, material transfer communication, and the like, however, it is made possible to freely transfer data without needing the right of token. As for drawing, for example, an environment allowing mutual, free drawing like an ordinary interview reference is created on the communication media as well. Further, time-consuming meeting advance manipulation such as "material transfer" is executed in parallel to an ordinary job for executing a communication meeting as a sub-job different from the ordinary job. In this way, token ownership is provided for each media unit or each classification of meeting advance manipulation, and parallel processing is performed, an environment for smooth meeting advance manipulation being thus realized.

In the example heretofore described, menu selection is used as means for informing the terminal that the other party has been identified. However, it is also conceivable that the terminal device side automatically identifies the other party by means of speech recognition and/or image recognition in order to further lighten the burden of the user.

The present invention brings about the following effects.

①  Since switching to, a picture for presenting and explaining a material (i.e., principal picture of meeting) can be made after identifying the other party of the meeting, it is possible to keep the material secret.

②  Since the other party intended can be identified in a picture for identifying the other party of the meeting (i.e., picture before meeting), misidentification can be reduced.

③  Since a display picture has multiple windows and hence various media can be selected and combined for display, it is possible to provide an environment convenient to the user.

④  Since the display picture has fixed multiple windows depending upon the progress of meeting, it is possible to provide such a media manipulation environment that the user is not perplexed about how the user manipulates windows.

⑤  Since the picture before meeting is automatically, displayed when communication lines are connected, the user can be smoothly carried on the flow of the meeting prepared at the terminal side beforehand.

⑥  Since media other than a dynamic picture image can be displayed in the picture before meeting for identifying the other party in conjunction with voices, the other party can be identified by the sense of sight and the sense of hearing in the picture before meeting.

⑦  By using media other than a dynamic picture image in the principal picture of meeting, diverse presentation becomes possible.

⑧  Since menu selection can be made as means for informing the terminal that the other party has been identified, the manipulation is simple.

⑨  Since the principal picture of meeting has both an area for displaying an image common to the terminal of the other party and a menu display area for controlling the common image, smooth meeting operation becomes possible.

⑩  Since a menu for informing the terminal that the other party has been identified is displayed in a common display area independently of a meeting support menu displayed in the menu display area, it is possible to provide a easily selectable, convenient environment.

⑪  In the picture for identifying the other party before the meeting, the image inputted at the terminal of the other party is displayed at its own terminal. Thereby, mutual identification can be performed. In the principal picture of meeting, the material of its own terminal or the terminal of the other party is displayed on both its own terminal and the terminal of the other party. During the meeting, therefore, it is possible to advance the meeting while watching the same picture.

What is claimed is:

1. A telemeeting terminal device for performing communication between remote locations by a multiwindow function for displaying multiple media, said telemeeting terminal device comprising:

a display device for displaying multiple windows corresponding to said multiple media to effect communication between said remote locations; and means, coupled to said display device, for identifying the other party of a meeting before entering the meeting via said telemeeting terminal device by comparing identification information from the other party to prestored reference information.

2. A telemeeting terminal device according to claim 1, wherein said means for identifying the other party of the meeting comprises:

means for inputting a recognition medium peculiar to the other party;

means for registering recognition media of meeting participants;

means for collating said inputted recognition medium with said registered recognition media; and means for outputting the result of said collation.

3. A manipulation method of a telemeeting terminal device for performing communication between remote locations by a multiwindow function for displaying multiple media, said manipulation method comprising the steps of:
- displaying multiple windows corresponding to said multiple media to effect communication between said remote locations and displaying a result of said identification;
- identifying the other party of a meeting by comparing identification information from the other party to prestored reference information; and
- executing communication of a predetermined medium without obtaining token ownership existing between terminal devices.

4. A telemeeting terminal device according to claim 1, wherein positions of said multiple windows are fixed on said display device.

5. A telemeeting terminal device according to claim 1, wherein the means for identifying the other party of the meeting comprises:
- means for displaying an image of the other party transmitted form the other party; and
- means for receiving said identification information of the other party, comparing said identification information of the other party to reference information, displaying a result of the comparison on the display device and inputting an indication whether the meeting is to proceed based on the displayed result of the comparison and the image of the other party.

6. A telemeeting terminal device according to claim 5, wherein the means for receiving comprises means for selecting a menu displayed on one's own terminal device side.

7. A telemeeting terminal device according to claim 1, wherein said means for identifying the other party comprises a speech recognition device.

8. A telemeeting terminal device according to claim 1, wherein said means for identifying the other party of the meeting comprises means for recognizing a recognition media peculiar to the other party.

9. A telemeeting terminal device according to claim 1, wherein the means for identifying the other party of the meeting comprises means for selecting a menu on a picture displayed on one's own terminal device side.

10. A telemeeting terminal device for performing communication between remote locations by a multiwindow function for displaying multiple media, said telemeeting terminal device comprising:
- a display device for displaying multiple windows corresponding to said multiple media to effect communication between said remote locations;
- means, coupled to said display device, for identifying the other party of a meeting by comparing identification information from the other party to prestored reference information; and
- means, coupled to said display device, for presenting and explaining a material.

11. A telemeeting terminal device for performing communication between remote locations by a multiwindow function for displaying multiple media, said telemeeting terminal device comprising:
- a display device for displaying multiple windows corresponding to said multiple media to effect communication between said remote locations;
- first means, coupled to said display device, for identifying the other party of a meeting by comparing identification information from the other party to prestored reference information;
- second means, coupled to said display device, for presenting and explaining a material; and
- third means for switching a state from said first means to said second means.

12. A telemeeting terminal device for performing communication between remote location by a multiwindow function for displaying multiple media, said telemeeting terminal device comprising:
- a display device for displaying multiple windows corresponding to said multiple media to effect communication between said remote locations;
- means for switching from a picture before meeting for identifying the other party to a principal picture for presenting and explaining materials; and
- means, coupled to said display device, for identifying the other party of a meeting by comparing identification information from the other party to prestored reference information.

13. A telemeeting terminal device according to claim 12, wherein switching from the picture before meeting to the principal picture is executed after the other party intended has been identified.

14. A telemeeting terminal device according to claim 12, further comprising means responsive to identification of the other party of a meeting for matching a material for the meeting displayed on the terminal device of the other party with that displayed on one's own terminal device.

15. A telemeeting terminal device according to claim 12, further comprising means responsive to identification of the other party of the meeting for automatically executing the matching operation without a directive of an operator.

16. A telemeeting terminal device according to claim 12, wherein the picture before meeting and the principal picture are displayed in said multiple windows.

17. A telemeeting terminal device according to claim 12, wherein positions of said multiple windows are fixed on said display device.

18. A telemeeting terminal device according to claim 12, further comprising means responsive to connection of communication lines for automatically displaying the picture before meeting.

19. A telemeeting terminal device according to claim 12, wherein the picture before meeting comprises a selection menu for inputting an indication whether the meeting is to proceed based on the result of identification of the other party.

20. A telemeeting terminal device according to claim 12, wherein an image display area of the principal picture comprises:
- an area for displaying an image common to the terminal device of the other party and one's own terminal device; and
- a menu display area for controlling said common image display area and displaying a meeting support menu to support the advance of a meeting.

21. A telemeeting terminal device according to claim 20, wherein a menu for informing one's own terminal device that the other party has been identified is displayed on the common image display area provided independently of said meeting support menu.

22. A telemeeting terminal device according to claim 12, wherein at least a dynamic picture image medium is displayed on the picture before meeting and at least a medium different from said dynamic picture image medium is displayed on the principal picture.

23. A telemeeting terminal device according to claim 12, further comprising:
a first window having display contents changed according to the progress of a meeting; and
a second window having display contents changed irrespectively of the progress of the meeting.

24. A telemeeting terminal device according to claim 12, further comprising means for executing at least one of actions for setting, registering and operating the picture before meeting and the principal picture.

25. A telemeeting terminal device according to claim 23, further comprising means for switching to said first window upon a directive given on said second window.

26. A telemeeting terminal device according to claim 23, further comprising means for switching to said second window upon a directive given on said first window.

27. A telemeeting terminal device for performing communication between remote locations by multiwindow function for displaying multiple media, said telemeeting terminal device comprising:
a display device for displaying multiple windows corresponding to said multiple media to effect communication between said remote locations;
means for executing, on the basis of preset time, at least one of switching from a picture before meeting for identifying the other party to a principal picture for presenting and explaining materials and switching to a picture after meeting for a participant's identification of end of a meeting; and
means, coupled to said display device for identifying the other party of a meeting by comparing identification information from the other party to prestored reference information.

28. A telemeeting terminal device according to claim 27, further comprising means for outputting an indication of elapse of the preset time.

29. A telemeeting terminal device according to claim 27, further comprising means for changing the preset time.

30. A telemeeting terminal device for performing communication between remote locations by a multi-window function for displaying multiple media, said telemeeting terminal device comprising:
a display device for displaying multiple windows corresponding to said multiple media to effect communication between said remote locations;
means, coupled to said displaying means, for displaying on said display device, in a picture before meeting for identifying the other party, an image inputted from a terminal device of the other party on one's own terminal device and for displaying on said display device, in a principal picture for presenting and explaining materials, a material displayed on at least one out of one's own terminal device and the terminal device of the other party on both one's own terminal device and the terminal device of the other party; and
means for identifying the other party by comparing identification information from the other party to prestored reference information.

31. A telemeeting terminal device for performing communication between remote locations by a multi-window function for displaying multiple media, said telemeeting terminal device comprising:
a display device for displaying multiple windows corresponding to said multiple media to effect communication between said remote locations;
means, coupled to said display device, for identifying the other party of a meeting by comparing identification information from the other party to prestored reference information; and
means responsive to the end of a meeting for switching from a principal picture for presenting and explaining materials to a picture after meeting for a participant's identification of the end of the meeting.

32. A telemeeting terminal device according to claim 31, further comprising means responsive to switching to the picture after meeting for selecting one out of operation of releasing a communication line and operation of switching to a principal picture.

33. A telemeeting terminal device for performing communication between remote locations by a multi-window function for displaying multiple media, said telemeeting terminal device comprising:
a display device for displaying multiple windows corresponding to said multiple media to effect communication between said remote locations;
means, coupled to said display device, for identifying the other party of a meeting by comparing identification information from the other party to prestored reference information; and
means for releasing communication lines in response to a result of identification of the other party in a picture before the meeting.

34. A telemeeting terminal device for performing communication between remote locations by a multi-window function for displaying multiple media, said telemeeting terminal device comprising:
a display device for displaying multiple windows corresponding to said multiple media to effect communication between said remote locations;
means, coupled to said display device, for identifying the other party of a meeting by comparing identification information from the other party to prestored reference information;
means, coupled to said display device, for presenting and explaining materials; and
means, coupled to said display device, for identifying a midway participant by comparing identification information from the midway participant to prestored reference information.

35. A manipulation method of a telemeeting terminal device for performing communication between remote locations by a multiwindow function for displaying multiple media, said manipulation method comprising the steps of:
displaying multiple windows corresponding to said multiple media to effect communication between said remote locations;
identifying the other party of a meeting by comparing identification information from the other party to prestored reference information and displaying a result of said identification; and
giving token ownership existing between terminal devices to at least one of communication media and meeting advancing manipulation operations.

36. A telemeeting terminal device for performing communication between remote locations by a multi-window function for displaying multiple media, said telemeeting terminal device comprising:
a display device for displaying multiple windows corresponding to said multiple media to effect communication between said remote locations;

means, coupled to said display device, for identifying the other party of a meeting by comparing identification information from the other party to prestored reference information;

first processing means for processing participation of an expected participant part-way participating in a meeting; and second processing means for processing participation of a new participant part-way participating in the meeting, said processing performed by said second processing means being different than said processing performed by said first processing means.

37. A telemeeting terminal device according to claim 36, wherein switching to a principal picture for presenting and explaining a material is immediately performed by said first processing means, and switching to said principal picture is performed by said second processing means after an intended midway participant has been identified.

38. A telemeeting terminal device according to claim 36, wherein means for identifying a midway participant comprises a display device for displaying a dynamic picture image of the midway participant.

39. A telemeeting terminal system, comprising:

a plurality of telemeeting terminal devices each including a multiwindow function for displaying multiple media, a display device for displaying multiple windows corresponding to said multiple media to effect communication between remote locations and means, coupled to the display device, for identifying the other party of a meeting by comparing identification information from the other party to prestored reference information, said telemeeting terminal devices being connected via at least one of an electronic exchange and a communication network and located at said remote locations; and means for allowing said electronic exchange and communication network to administer telemeeting terminal devices displaying pictures on the basis of progress of a meeting in distinction from telemeeting terminal devices displaying pictures irrespectively of the progress of the meeting.

40. A telemeeting terminal device for performing communication between remote locations by a multiwindow function for displaying multiple media, said telemeeting terminal device comprising:

a display device for displaying multiple windows corresponding to said multiple media to effect communication between said remote locations;

means, coupled to said display device for identifying the other party of a meeting by comparing identification information from the other party to prestored reference information and thereafter switching to a principal picture to present and explain materials; and means for allowing a participant manipulating a terminal device provided with token ownership to switch a common display area of said principal picture.

41. A telemeeting terminal device for performing communication between remote locations by a multiwindow function for displaying multiple media, said telemeeting terminal device comprising:

a display device for displaying multiple windows corresponding to said multiple media to effect communication between said remote locations;

means, coupled to said display device, for identifying the other party of a meeting by comparing identification information from the other party to prestored reference information and thereafter switching to a principal picture to present and explain materials;

means for displaying on said display device an image representing presence/absence of a token ownership on said principal picture; and means for allowing a participant manipulating said terminal device provided with said token ownership to switch a common display area of said principal picture.

42. A telemeeting terminal device for performing communication between remote locations by a multiwindow function for displaying multiple media, said telemeeting terminal device comprising:

a display device for displaying multiple windows corresponding to said multiple media to effect communication between said remote locations;

means, coupled to said display device, for identifying the other party of a meeting by comparing identification information from the other party to prestored reference information; and means, responsive to an action performed by an operator manipulating said terminal device to change contents of a display picture displayed on said display device, for executing movement of token ownership between terminal devices.

43. A telemeeting terminal device for performing communication between remote locations by a multiwindow function for displaying multiple media, said telemeeting terminal device comprising:

a display device for displaying multiple windows corresponding to said multiple media to effect communication between said remote locations;

means, coupled to said display device, for identifying the other party of a meeting by comparing identification information from the other party to prestored reference information; and means for executing communication of a predetermined medium without obtaining token ownership existing between terminal devices.

44. A telemeeting terminal device for performing communication between remote locations by a multiwindow function for displaying multiple media, said telemeeting terminal device comprising:

a display device for displaying multiple windows corresponding to said multiple media to effect communication between said remote locations;

means, coupled to said display device, for identifying the other party of a meeting by comparing identification information from the other party to prestored reference information; and means for giving token ownership existing between terminal devices to at least one of communication media and meeting advancing manipulation operations.

45. A manipulation method of a telemeeting terminal device for performing communication between remote locations by a multiwindow function for displaying multiple media, said manipulation method comprising the steps of:

displaying multiple windows corresponding to said multiple media to effect communication between said remote locations; and identifying the other party of a meeting before entering the meeting via said telemeeting terminal device by comparing identification information from the other party to prestored reference information and displaying a result of said identification.

46. A manipulation method of a telemeeting terminal device according to claim 45, wherein said step of identifying the other party of the meeting comprises the steps of:

displaying an image of the other party transmitted from the other party; and receiving said identification information of the other party, comparing said identification information of the other party to reference information, displaying a result of the comparison on the display device and inputting an indication whether the meeting is to proceed based on the displayed result of the comparison and the image of the other party.

47. A manipulation method of telemeeting terminal device according to claim 45, wherein said step of identifying the other party of the meeting comprises the step of inputting the result of recognition of voices transmitted from the other party.

48. A manipulation method of a telemeeting terminal device for performing communication between remote locations by a multiwindow function for displaying multiple media, said manipulation method comprising the steps of:

displaying multiple windows corresponding to said multiple media to effect communication between said remote locations;

identifying the other party of a meeting by comparing identification information from the other party to prestored reference information and displaying a result of said identification; and permitting an operator to explain and present materials via said telemeeting terminal device.

49. A manipulation method of a telemeeting terminal device for performing communication between remote locations by a multiwindow function for displaying multiple media, said manipulation method comprising the steps of:

displaying multiple windows corresponding to said multiple media to effect communication between said remote locations;

identifying the other party of a meeting by comparing identification information from the other party to prestored reference information and displaying a result of said identification;

permitting an operator to present and explain materials via said telemeeting terminal device; and switching the state from said first step to said second step.

50. A manipulation method of a telemeeting terminal device for performing communication between remote locations by a multiwindow function for displaying multiple media, said manipulation method comprising the steps of:

displaying multiple windows corresponding to said multiple media to effect communication between said remote locations;

identifying the other party of a meeting by comparing identification information from the other party to prestored reference information and displaying a result of said identification; and switching from a picture before meeting for identifying the other party to a principal picture for presenting and explaining materials.

51. A manipulation method of a telemeeting terminal device for performing communication between remote locations by a multiwindow function for displaying multiple media, said manipulation method comprising the steps of:

displaying multiple windows corresponding to said multiple media to effect communication between said remote locations;

identifying the other party of a meeting by comparing identification information from the other party to prestored reference information and displaying a result of said identification; and executing, on the basis of preset time, at least one of switching from a picture before meeting for identifying the other party to a principal picture for presenting and explaining materials and switching to a picture after meeting for a participant's identification of end of a meeting.

52. A manipulation method of a telemeeting terminal device for performing communication between remote locations by a multiwindow function for displaying multiple media, said manipulation method comprising the steps of:

displaying multiple windows corresponding to said multiple media to effect communication between said remote locations;

identifying the other party of a meeting by comparing identification information from the other party to prestored reference information and displaying a result of said identification; and displaying, in a picture before meeting for identifying the other party, an image inputted from a terminal device of the other party on one's own terminal device and displaying, in a principal picture for presenting and explaining materials, a material displayed on either of said one's own terminal device and said terminal device of the other party on both of said one's own terminal device and said terminal device of the other party.

53. A manipulation method of a telemeeting terminal device for performing communication between remote locations by a multiwindow function for displaying multiple media, said manipulation method comprising the steps of:

displaying multiple windows corresponding to said multiple media to effect communication between said remote locations;

identifying the other party of a meeting by comparing identification information from the other party to prestored reference information and displaying a result of said identification; and switching, at the time of end of a meeting, from a principal picture for presenting and explaining materials to a picture after meeting for a participant's identification of the end of the meeting.

54. A manipulation method of a telemeeting terminal device for performing communication between remote locations by a multiwindow function for displaying multiple media, said manipulation method comprising the steps of:

displaying multiple windows corresponding to said multiple media to effect communication between said remote locations;

identifying the other party of a meeting by comparing identification information from the other party to prestored reference information and displaying a result of said identification; and releasing communication lines on the basis of a result of identification of the other party in a picture before meeting for identifying the other party.

55. A manipulation method of a telemeeting terminal device for performing communication between remote locations by a multiwindow function for displaying multiple media, said manipulation method comprising the steps of:

displaying multiple windows corresponding to said multiple media to effect communication between said remote locations;

identifying the other party of a meeting by comparing identification information from the other party to prestored reference information and displaying a result of said identification;

permitting an operator to present and explain materials via said telemeeting terminal device; and identifying a midway participant by comparing identification information from the midway participant to prestored reference information and displaying a result of said midway identification.

56. A manipulation method according to claim 55, wherein said step of identifying the midway participant comprises the steps of:

displaying an image of the midway participant transmitted from the midway participant; and receiving said identification information of the other party, comparing said identification information of the midway participant to reference information, displaying a result of the comparison and inputting an indication whether the meeting is to proceed based on the displayed result of the comparison and the image of the midway participant.

57. A manipulation method of a telemeeting terminal device for performing communication between remote locations by a multiwindow function for displaying multiple media, said manipulation method comprising the steps of:

displaying multiple windows corresponding to said multiple media to effect communication between said remote locations;

identifying the other party of a meeting by comparing identification information from the other party to prestored reference information and displaying a result of said identification;

first participation processing of participation of an expected participant part-way participating in a meeting; and second participation processing of participation of a new participant to part-way participate in the meeting, said second participation processing being different than said first participation processing.

58. A manipulation method of a telemeeting terminal system for performing communication among a plurality of telemeeting terminal devices being connected by at least one of an electronic exchange and a communication network and located at remote locations, comprising the steps of:

displaying multiple windows corresponding to said multiple media to effect communication between said remote locations;

identifying the other party of a meeting by comparing identification information from the other party to prestored reference information; and allowing said electronic exchange and communication network to administer telemeeting terminal devices displaying pictures on the basis of progress of a meeting in distinction from telemeeting terminal devices displaying pictures irrespectively of the progress of the meeting.

59. A manipulation method of a telemeeting terminal device for performing communication between remote locations by a multiwindow function for displaying multiple media, said manipulation method comprising the steps of:

displaying multiple windows corresponding to said multiple media to effect communication between said remote locations;

identifying the other party of a meeting by comparing identification information from the other party to prestored reference information, displaying a result of said identification and thereafter switching to a principal picture to present and explain materials;

displaying an image representing presence/absence of a token ownership on said principal picture; and allowing a participant manipulating said terminal device provided with said token ownership to switch a common display area of said principal picture.

60. A manipulation method of a telemeeting terminal device for performing communication between remote locations by a multiwindow function for displaying multiple media, said manipulation method comprising the steps of:

displaying multiple windows corresponding to said multiple media to effect communication between said remote locations;

identifying the other party of a meeting by comparing identification information from the other party to prestored reference information, displaying a result of said identification and thereafter switching to a principal picture to present and explain materials; and allowing a participant manipulating a terminal device provided with said token ownership to switch a common display area of said principal picture.

61. A manipulation method of a telemeeting terminal device for performing communication between remote locations by a multiwindow function for displaying multiple media, said manipulation method comprising the steps of:

displaying multiple windows corresponding to said multiple media to effect communication between said remote locations;

identifying the other party of a meeting by comparing identification information from the other party to prestored reference information and displaying a result of said identification; and executing movement of token ownership between terminal devices on the basis of an action performed by an operator manipulating said terminal device to change contents of a display picture displayed on said terminal device.

62. A manipulation method of telemeeting terminal device according to claim 45, wherein said step of identifying the other party of the meeting comprises the steps of:

inputting a recognition medium peculiar to the other party;

registering recognition media of meeting participants;

collating said inputted recognition medium with said registered recognition media; and outputting the result of said collation.

* * * * *